United States Patent
Lablans

(10) Patent No.: US 8,180,817 B2
(45) Date of Patent: May 15, 2012

(54) ENCIPHERMENT OF DIGITAL SEQUENCES BY REVERSIBLE TRANSPOSITION METHODS

(75) Inventor: Peter Lablans, Morris Township, NJ (US)

(73) Assignee: Temarylogic LLC, Morristown, NJ (US)

( * ) Notice: Subject to any disclaimer, the term of this patent is extended or adjusted under 35 U.S.C. 154(b) by 0 days.

(21) Appl. No.: 13/081,806

(22) Filed: Apr. 7, 2011

(65) Prior Publication Data

US 2011/0182421 A1   Jul. 28, 2011

Related U.S. Application Data

(63) Continuation of application No. 11/534,777, filed on Sep. 25, 2006, now Pat. No. 7,930,331.

(60) Provisional application No. 60/720,655, filed on Sep. 26, 2005.

(51) Int. Cl.
*G06F 7/58* (2006.01)
(52) U.S. Cl. ........................................ 708/250; 708/400
(58) Field of Classification Search .................. 708/250, 708/252, 400–410
See application file for complete search history.

(56) References Cited

U.S. PATENT DOCUMENTS

| | | | |
|---|---|---|---|
| 3,773,977 A | 11/1973 | Guanella |
| 3,921,151 A | 11/1975 | Guanella |
| 3,970,790 A | 7/1976 | Guanella |
| 3,978,288 A | 8/1976 | Bruckner et al. |
| 4,160,123 A | 7/1979 | Guanella |
| 4,870,682 A | 9/1989 | Morrey et al. |
| 5,799,088 A | 8/1998 | Raike |
| 6,442,190 B1 | 8/2002 | Nguyen |
| 6,636,552 B1 | 10/2003 | Banister |
| 7,071,866 B2 | 7/2006 | Iny et al. |
| 7,103,030 B2 | 9/2006 | Jones |
| 2005/0083901 A1 | 4/2005 | Kim et al. |
| 2007/0076868 A1 | 4/2007 | Ming |

*Primary Examiner* — Tan Mai
(74) *Attorney, Agent, or Firm* — Diehl Servilla LLC

(57) ABSTRACT

Methods for transposing elements of a sequence according to a rule, wherein the rule is derived from pseudo-noise or pseudo-noise like binary and non-binary sequences are disclosed. Sequences of transposed symbols can be recovered by applying a reversing rule. Sets of orthogonal hopping and transposition rules are created by applying transposition rules upon themselves. Sets of orthogonal hopping and transposition rules are also created from binary and non-binary Gold sequences.

20 Claims, 11 Drawing Sheets

ENCIPHERMENT OF DIGITAL SEQUENCES BY REVERSIBLE TRANSPOSITION METHODS

CROSS-REFERENCE TO RELATED APPLICATIONS

This application is a continuation and claims the benefit of U.S. Non-Provisional patent application Ser. No. 11/534,777 filed on Sep. 25, 2006 which claims the benefit of Provisional Patent Application Ser. No. 60/720,655, filed Sep. 26, 2005, which are both incorporated herein by reference.

BACKGROUND OF THE INVENTION

This invention relates to the encipherment of binary and non-binary digital sequences such as used in communications by reversible transposition methods and the decipherment of sequences enciphered by reversible transposition methods. More specifically it relates to applying methods using recoded binary and non-binary pseudo-noise sequences generated by LFSR based sequence generators and other methods that will generate reversible sequences.

Sequences comprised of digital elements have known applications in communications and other applications. In general binary pseudo-noise or PN-sequences are used. Application of non-binary sequences is also possible. Linear feedback shift register (LFSR) circuits or methods are often used for the generation and detection of sequences. LFSR circuits with p register elements can generate ($n^p-1$) length unique n-valued sequences which are called maximum-length sequences. It is often desirable to encrypt digital data for transmission, or storage on a data-storage medium such as optical disks or as an embedded message for watermarking applications.

Substitution ciphers are known, wherein according to some rules one symbol or series of symbols is replaced by another. Another encipherment method is transposition wherein in a series of symbols the order of the symbols is changed according to a rule or set of rules.

While transposition encipherment can be used for security reasons, it can also be used to randomize a process in a recoverable way. One such application is the creation of sequences for application in frequency hopping in telecommunications. In many cases binary LFSR based pseudo-random sequences are used as a number generator to create hopping rules. Orthogonality of the sequences is important so that each user in a hop is assigned a unique frequency slot. Another application is in time-hopping applications. Herein each user is assigned a unique time-slot, so that pulses of different users do not collide. Non-binary pseudo-random sequences have statistical advantages over the generally used binary sequences. It is often useful to have a local method to generate the transposition rule as well as the rule to recover the transposed sequence. Also the ability to select from a large number of possible encipherment rules is advantageous.

Accordingly, new methods for symbol transposition in a pseudo-random like fashion are required.

SUMMARY OF THE INVENTION

In view of the more limited possibilities of the prior art in enciphering binary and non-binary digital sequences by transposition, the current invention provides methods and apparatus for the rules of encipherment by transposition of digital sequences and the decipherment of the encrypted sequences.

The general purpose of the present invention, which will be described subsequently in greater detail, is to provide novel methods and apparatus which can be applied in the encipherment by transposition using digital sequences with pseudo-noise or pseudo-noise like properties and the decipherment of the encrypted sequences. Sequences are made of series of symbols with an assigned position relative to an assumed or assigned origin or anchor point. The individual symbols and their order in a sequence may represent an electrical or optical signal. The position of a symbol may represent a physical order, a time slot, a frequency, a color or any other phenomenon or concept that can be represented as a position.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

Binary in the context of this application means 2-valued. Multi-valued and n-valued in the context of this invention mean an integer greater than 2.

It is one aspect of the present invention to provide new methods to transpose symbols in a sequence of digital symbols in a recoverable or reversible manner.

It is another aspect of the present invention to enable detection of transposed sequences by knowing the transposition rule.

It is a further aspect of the present invention to provide a method for creating transposition rules based on pseudo-random binary and non-binary sequences.

It is another aspect of the present invention to provide a method for creating transposition rules based on pseudo-random sequences with no forbidden word.

It is a further aspect of the present invention to provide a method of creating plurality of orthogonal hopping rules by repeated application of a transposition rule.

It is another aspect of the present invention to provide a method for creating a plurality of orthogonal hopping rules based on Gold sequences.

It is a further aspect of the present invention to provide a system which implements the methods provided as different aspects of the present invention.

BRIEF DESCRIPTION OF THE DRAWINGS

Various other objects, features and attendant advantages of the present invention will become fully appreciated as the same becomes better understood when considered in conjunction with the accompanying drawings, and wherein.

DETAILED DESCRIPTION OF THE INVENTION

The Related Art

Figure 1:
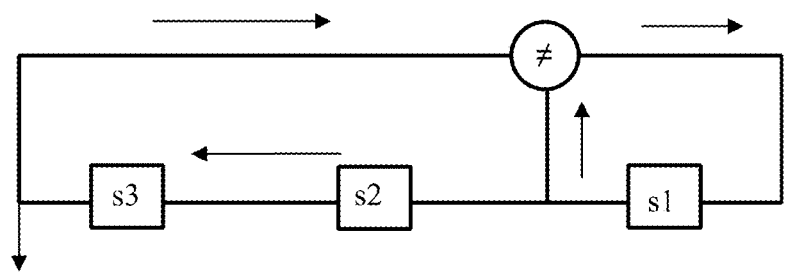
FIG. 1 is a block diagram of a binary LFSR based sequence generator.

There are different ways to transpose symbols in a sequence or a word comprised of n symbols. In general one can create transpositions by selecting one of the possible reversible permutations of a word of n symbols. A symbol may be represented by a single element or a number of elements. A symbol as one aspect of the present invention will be assumed to being able to be represented by a single element, keeping in mind that it can in actuality be represented by a plurality of elements. A word or sequence of n symbols has $n! = 1*2*3*4* \ldots *(n-1)*n$ possible permutations. A sequence of n symbols may comprise p different symbols wherein p<n. In that case some permutations are of course identical.

A transposition rule may be created by a pseudo-random number generator. A reversible transposition rule for the transposition of n symbols may be considered an n valued reversible inverter.

Pseudo-Random Sequences as Transposition Rules.

The inventor describes 'word-based' methods for generating pseudo-random and pseudo-random like binary and non-binary sequences in U.S. Provisional Patent Application No. 60/695,317 filed on Jun. 30, 2005 entitled THE CREATION AND DETECTION OF BINARY AND NON-BINARY PSEUDO-NOISE SEQUENCES NOT USING LFSR CIRCUITS and in U.S. patent application Ser. No. 11/427,498 filed on Jun. 29, 2006 entitled THE CREATION AND DETECTION OF BINARY AND NON-BINARY PSEUDO-NOISE SEQUENCES NOT USING LFSR CIRCUITS which are hereby incorporated by reference herein in its entirety. One aspect of that invention demonstrates that an n-valued pseudo-noise or maximum length sequence which can be generated by an LFSR circuit with a shift register with p memory elements of a length of $(n^P-1)$ symbols, can also be generated by a method combining in a prescribed fashion $(n^P-1)$ unique words of p n-valued symbols and taking from each word one symbol to create the sequence. The order of the symbols in the sequence is determined by the order of the words.

The words are identical to the consecutive states of the shift register. Each word is unique until it repeats itself again. In an LFSR the repeat is after $(n^P-1)$ states. The words may be assumed to represent a decimal number. Within the $(n^P-1)$ cycles each word and its representative decimal number in a pseudo-random sequence is unique. One may consider the order of the decimal numbers then as a reversible shuffling rule or a transposition rule.

For instance a binary LFSR pseudo-noise generator with a 3 element shift register can generate a pseudo-noise sequence of length $(2^3-1)=7$ elements. The following table shows how the sequence can be generated by using overlapping words of 3 bits. As an illustrative example the generated sequence is [0 0 1 1 1 0 1] created from the first bit of each word.

TABLE 1

|  | s3 | s2 | s1 |  |  | dec1 | dec2 | sequence |
|---|---|---|---|---|---|---|---|---|
| out1 | 0 | 0 | 1 |  |  | 1 | 4 | 0 |
| out3 |  | 0 | 1 | 1 |  | 3 | 6 | 0 |
| out7 |  |  | 1 | 1 | 1 | 7 | 7 | 1 |
| out6 |  |  |  | 1 | 1 | 0 | 6 | 3 | 1 |
| out5 |  |  |  |  | 1 | 0 | 1 | 5 | 5 | 1 |
| out2 |  |  |  |  |  | 0 | 1 | 0 | 2 | 2 | 0 |
| out4 |  |  |  |  |  |  | 1 | 0 | 0 | 4 | 1 | 1 |

Figure 2:
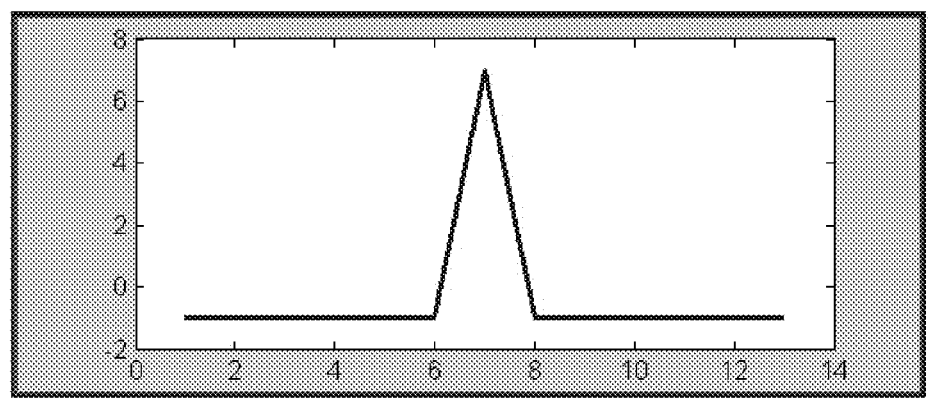
FIG. 2 shows a correlation graph.

FIG. 1 shows the diagram of the LFSR based circuit that will generate the binary pseudo-noise sequence. The initial (or seed) state of the LFSR is [0 0 1]. The forbidden state in this configuration is [0 0 0]. FIG. 2 shows the auto-correlation graph of the generated sequence.

The Table 1. shows a column 'dec1', which is the radix-10 value of the 3 bit word, with the most significant bit being the first bit of the word. The column 'dec2' in the table shows the radix-10 value of the 3-bit word with the last bit being the most significant bit of each 3-bit word.

The columns in the Table 1. under 'dec1' and 'dec2' can be interpreted as a rule for a transposition of symbols in a sequence. This transposition may be considered orthogonal in the sense that each symbol will be transposed to a unique new position, in such a way that the transposition can be reversed and no position will be shared by two symbols.

Clarification about the transposition rules will be provided next. First of all it should be clear what the transposition rule actually means. Two possible different ways to apply a transposition rule are provided in the following Table 2 and Table 3.

TABLE 2

| sequence | Origin | dec1 | trans_to*1 | seq_res1 | trans_to*2 | seq_res2 | Inverse |
|---|---|---|---|---|---|---|---|
| 0 | 1 | 1 | 1 | 0 | 1 | 0 | 1 |
| 0 | 2 | 3 | 6 | 0 | 4 | 1 | 6 |
| 1 | 3 | 7 | 2 | 0 | 6 | 0 | 2 |
| 1 | 4 | 6 | 7 | 1 | 3 | 1 | 7 |
| 1 | 5 | 5 | 5 | 1 | 5 | 1 | 5 |

TABLE 2-continued

| sequence | Origin | dec1 | trans_to*1 | seq_res1 | trans_to*2 | seq_res2 | Inverse |
|---|---|---|---|---|---|---|---|
| 0 | 6 | 2 | 4 | 1 | 7 | 1 | 4 |
| 1 | 7 | 4 | 3 | 1 | 2 | 0 | 3 |

Table 2 and Table 3 show 2 different interpretations of the transposition rules. In Table 2 the transposition column under 'dec1' means that a symbol on a position as stated in the column under Origin is being transposed to the position as stated in the column under 'dec1' in Table 2. So the symbol in the original position 1 is being transposed to position 1. The symbol in position 2 is transposed to position 3; the symbol in position 3 is being transposed to position 7; etc. The result of that transposition is shown in Table 2 in the column under 'trans_to*1'. Or in other words: the first position of the sequence as a result of the transposition has a symbol that originally was in the first position of the un-transposed sequence. The second symbol in the transposed sequence is the symbol originally in the 6$^{th}$ position; the third symbol in the transposed sequence is the second symbol in the original sequence; etc.

Figure 3:
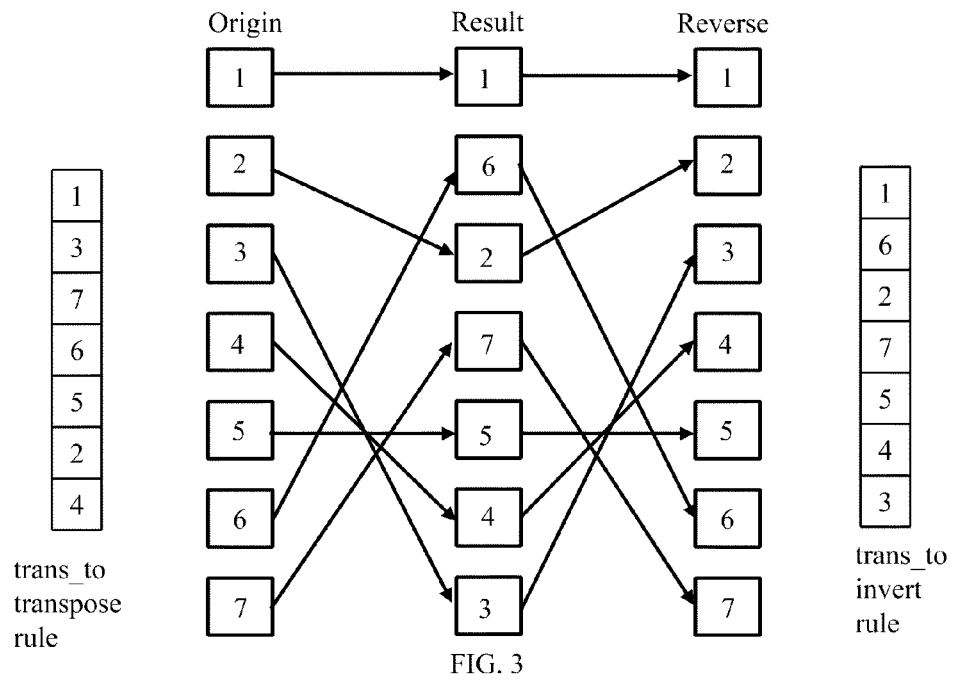
FIG. 3 is a diagram of a transposition rule.

In order to confirm the rule it is executed an additional time on the column under 'trans_to*1' and the result of the transposition is shown in the column under 'trans_to*2'. The numbers in the column indicate the original position of the symbols. The actual transposed sequence is shown in the column in Table 2 'seq_res2'. The column under Inverse shows the inverse transposition to the rule of 'dec1'. The Inverse Transposition applied to the result in column 'trans_to*1' will create the original sequence. Applying the Inverse Transposition twice to the result under 'trans_to*2' will also recreate the original sequence. The transposition by 'trans_to' rule and its reverse is shown graphically in FIG. 3.

Table 3 shows the transpositions by the 'transpose from' rule.

TABLE 3

| sequence | Origin | dec1 | trans_from*1 | seq_res1 | trans_from*2 | seq_res2 | Inverse |
|---|---|---|---|---|---|---|---|
| 0 | 1 | 1 | 1 | 0 | 1 | 0 | 1 |
| 0 | 2 | 3 | 3 | 1 | 7 | 1 | 6 |
| 1 | 3 | 7 | 7 | 1 | 4 | 1 | 2 |
| 1 | 4 | 6 | 6 | 0 | 2 | 0 | 7 |
| 1 | 5 | 5 | 5 | 1 | 5 | 1 | 5 |
| 0 | 6 | 2 | 2 | 0 | 3 | 1 | 4 |
| 1 | 7 | 4 | 4 | 1 | 6 | 0 | 3 |

The 'transpose from' interpretation of the rule means that the rule as displayed in Table 3 in the column under 'dec1' means that the symbol in a certain position in the transposed sequence comes from the position indicated by the number on that position. The result is shown in Table 3 in the column under 'trans_from*1'. The symbol in position 1 of the transposed sequence is coming from position 1 of the original sequence. The symbol in position 2 of the transposed sequence comes from position 3 of the original sequence. Etc, etc. The actual transposed binary sequence is shown in Table 3 in the column under 'seq_res1'.

One can apply the transposition rule on the transposed sequence which will result in the transposition as shown in Table 3 in the column under 'trans_from*2'. The actual twice transposed sequence is shown in Table 3 in the column under 'seq_res2'.

Figure 4:
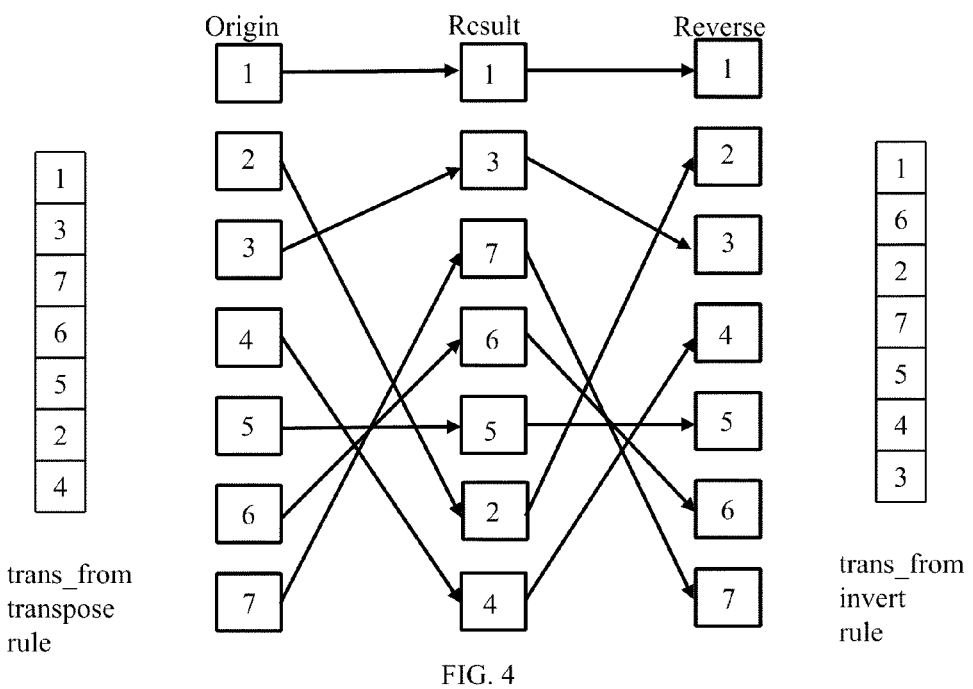
FIG. 4 is a diagram of another transposition rule.

The Inverse Transposition rule to reverse this example of a 'Transpose From' rule is shown in Table 3 in the column under 'Inverse'. The inversion rules for both 'from' and 'to' rules look identical, but are of course applied differently. In fact the 'transpose to' rule is the inverse of the 'transpose from' rule. The transposition by 'trans_from' rule and its inverse is shown in FIG. 4.

Pseudo-Code

The 'to' and 'from' transposition rules can be more easily explained in computer program pseudo-code. The following Table 4 shows four columns, each with 7 elements.

TABLE 4

| origin | rule | result_to | result_from |
|---|---|---|---|
| 1 | 1 | 1 | 1 |
| 2 | 3 | 6 | 3 |
| 3 | 7 | 2 | 7 |
| 4 | 6 | 7 | 6 |
| 5 | 5 | 5 | 5 |
| 6 | 2 | 4 | 2 |
| 7 | 4 | 3 | 4 |

The 'to' transposition rule can be written as:

```
FOR i=1:7
    INDEX=RULE(i)
    RESULT_TO(INDEX)=ORIGIN(i)
NEXT
```

The transposition_to rule as provided in the table can be applied to a sequence of 7 symbols seq=[a b c d e f g]. Applying the rule will lead to [a f b g e d c]. It should be clear that the symbols 'a', etc are selected as different characters to differentiate between them. The value of a symbol is to be determined separately from the transposition rule and can be any n-valued symbol.

The 'from' transposition rule can be written as:

```
FOR i=1:7
    INDEX=RULE(i)
    RESULT_FROM(i)=ORIGIN(INDEX)
END
```

Applying the transposition from rule from Table 4 to [a b c d e f g] will provide [a c g f e b d].

For simplicity reasons the 'transpose from' method will be used for illustrative purposes to describe the present invention. The reason for that is that the rule provides the index of the transposition. The "transposition to" requires an intermediate step to display the index of the transposed sequence. This is not fundamental to the method, but may be confusing. It should be clear that the 'transpose to' method can also be used in the provided examples.

The Forbidden Initial State

LFSR based sequence generators have an initial state of the shift register that is known as the 'forbidden' state. For instance when the LFSR applies only binary XOR functions, the 'forbidden' state of the shift register is all 0. In general a 'forbidden' state of a shift register does not create any change. This means that the shift register feedbacks into the feedback functions create a new input to the shift register, followed by a clock-pulse with a shift of the content of the registers in such a way that the new content of the shift register is identical to the previous content. Because the shift register does not change its content, the output of the circuit will be a sequence of identical symbols (in this case 0s), which in many cases is not desirable.

One can use the binary EQUAL function as feedback function. In that case the all 1 content of the shift register will be the forbidden state. The same phenomenon of 'forbidden' states will occur in higher value or n-valued LFSR based sequence generators. The 'forbidden' state will depend on the applied n-valued functions in the feedback path.

The significance of the 'forbidden' state is that it creates an LFSR word that does not occur in an allowed sequence generator. That means that this word does not occur in an LFSR PN generator based transposition rule. In the binary case using an LFSR using only XOR functions it means that the word comprising all 0s does not occur. This is not a problem in a transposition wherein a position 0 does not occur. However in the case where all 1s cannot occur (using only the EQUAL function) it means that all 0s can occur and all 1s cannot. This again means that the transposition rule includes a position 0.

Figure 5:
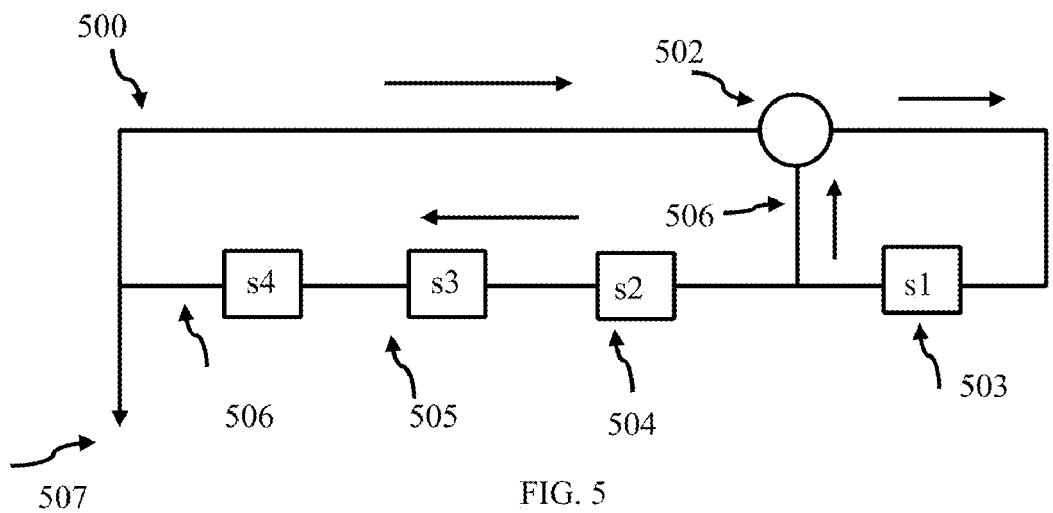
FIG. 5 is a diagram of an LFSR based sequence generator.

As an illustrative example of the effect of the selected feedback function the LFSR circuit of which a diagram is shown in FIG. 5 will be used. The circuit 500 in FIG. 5 is a binary LFSR based pseudo-noise sequence generator. With a 4-element shift register the circuit 500 generates a PN sequence of length 15. The circuit has a single tap 506 with a binary function 502.

When the function of device 502 is the binary XOR function and the initial state of the shift register is [0 1 1 0] then the generated 15-bits PN sequence is: [0 1 1 0 0 1 0 0 0 1 1 1 1 0 1]. The transposition rule (equivalent with 'dec1' in the previous example) formed from overlapping 4 bits words is: [6 12 9 2 4 8 1 3 7 15 14 13 10 5 11].

When the function of device 502 is the binary EQUAL function and the initial state of the shift register is [0 1 1 0] then the generated 15-bits PN sequence is: [0 1 1 0 1 1 1 0 0 0 0 1 0 1 0]. The transposition rule (equivalent again with 'dec1' in the previous example) is: [6 13 11 7 14 12 8 0 1 2 5 10 4 9 3]. The 'forbidden' state in this case is [1 1 1 1] which is equivalent with 'dec1' position 15 and cannot occur in this example. The initial state [0 0 0 0] is valid and will occur and is equivalent with 'dec1' position 0. This position will occur in 'dec1'. In general positions of symbols in a sequence are represented by using 1 as the start position. In order to make 'dec1' in this case a usable transposition rule one should add a 1 to all positions. In that case the transposition rule becomes: [7 14 12 8 15 13 9 1 2 3 6 11 5 10 4].

The Rule for Reversing the Transposition

The 'transpose from' rule is used to illustrate one aspect of the present invention. It should be clear that the 'transpose to' rule will in fact reverse the transposition. If one transposes a sequence for instance twice then the resulting sequences has to be reverse transposed twice to recreate the original sequence. One can also recreate or inverse the transposition by applying the transposition rule a pre-determined number of times. This is demonstrated in the following Table 5.

TABLE 5

| orig-inal | start [0 1 1] | | | | | | | start [0 1 0] | | | | | | |
|---|---|---|---|---|---|---|---|---|---|---|---|---|---|---|
| | 1 | 2 | 3 | 4 | 5 | 6 | 7 | 1 | 2 | 3 | 4 | 5 | 6 | 7 |
| t1 | 3 | 7 | 6 | 5 | 2 | 4 | 1 | 2 | 4 | 1 | 3 | 7 | 6 | 5 |
| t2 | 6 | 1 | 4 | 2 | 7 | 5 | 3 | 4 | 3 | 2 | 1 | 5 | 6 | 7 |
| t3 | 4 | 3 | 5 | 7 | 1 | 2 | 6 | 3 | 1 | 4 | 2 | 7 | 6 | 5 |
| t4 | 5 | 6 | 2 | 1 | 3 | 7 | 4 | 1 | 2 | 3 | 4 | 5 | 6 | 7 |
| t5 | 2 | 4 | 7 | 3 | 6 | 1 | 5 | | | | | | | |
| t6 | 7 | 5 | 1 | 6 | 4 | 3 | 2 | | | | | | | |
| t7 | 1 | 2 | 3 | 4 | 5 | 6 | 7 | | | | | | | |

The left side of the table shows the transposition rule generated by the sequence generator of FIG. 1 with initial shift register content [0 1 1]. This table shows that after 7 transpositions the original situation has been recreated. The right side of the table shows the transposition rule generated by the same circuit but with initial condition [0 1 0]. It takes 4 transpositions to recreate the original situation.

This shows that a new transposition rule can be created by using the same transposition rule more than once. However one should be careful not to use the transposition rule too many times and thus recreate the original. Also changing the initial state of the LFSR will create a different transposition rule.

Another way to change a transposition rule of n positions is by determining the modulo-n residue of the rule and then adding a 1.

One can interpret the generated LFSR words which will form the transposition rule in reverse. That is: instead of interpreting [0 0 1] as decimal 1 one can read this a decimal 4. This will change the transposition rule for a specific initial value of the LFSR, however it does not change the principle. In that case a binary LFSR with an n-element shift register will also generate $(2^n-1)$ different numbers ranging from either 1 to $(2^n-1)$ or from 0 to $(2^n-2)$.

The Effects of Transposition

Figure 6:
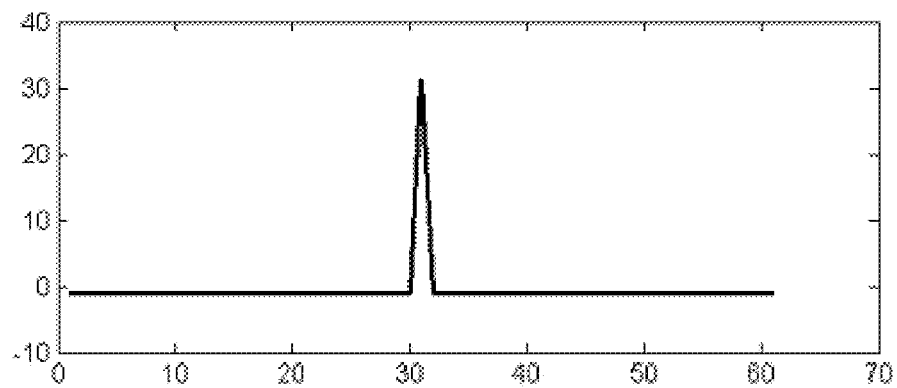
FIG. 6 shows a correlation graph.

One way to show the effects of transposition is to submit a known binary pseudo-noise sequence to a transposition rule. The quality of transposition can be demonstrated by the auto-correlation and cross-correlation graphs. The sequence that will be transposed is seqbin_31=[1 1 1 1 1 0 1 0 0 0 1 0 0 1 0 1 0 1 1 0 0 0 0 1 1 1 0 0 1 1 0]. This sequence is a pseudo-noise sequence of which the auto-correlation graph is shown in FIG. 6. This sequence will be transposed using a rule generated by a 5 element binary shift register with initial content [0 1 1 0 0].

Figure 7:
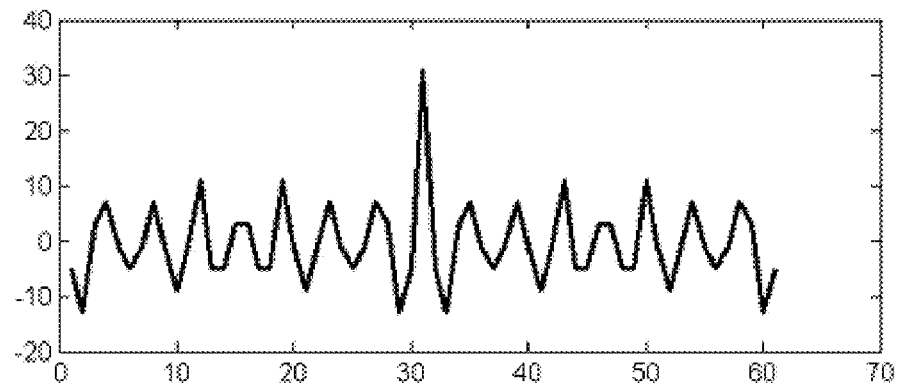
FIG. 7 shows another correlation graph.
Figure 8:
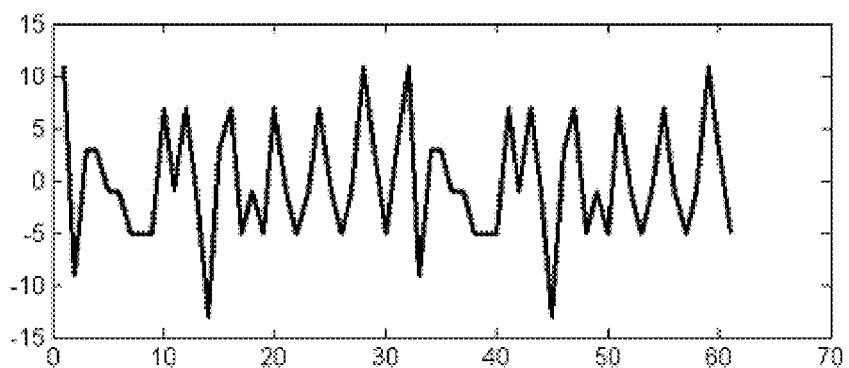
FIG. 8 shows a cross-correlation graph.

The transposition rule is: [12 6 3 1 16 8 20 26 13 22 11 21 10 5 2 17 24 28 14 23 27 29 30 31 15 7 19 9 4 18 25]. Transposing sequence seqbin_31 with this rule creates: seqbin_31_trans=[0 0 1 1 1 0 0 1 0 0 1 0 0 1 1 0 1 0 1 0 0 1 1 0 0 1 1 0 1 1 1]. The auto-correlation graph of seqbin_31trans is shown in FIG. 7. The cross-correlation graph of the sequences seqbin_31 and seqbin_31_trans is shown in FIG. 8.

It should be clear that correlation between the original sequence and the transposed sequence will not be helpful in detecting the sequence.

The inverse rule of a transposition rule can be expressed in the following pseudo-code:

```
FOR i=1: n
    IND = RULE (i)
    INVERSE(IND) = i
END
```

The vector RULE is the transposition rule vector. The vector INVERSE is the inverting rule. This approach applied to the above transposition rule for a 31 symbol sequence will generate INVERSE=[4 15 3 29 14 2 26 6 28 13 11 1 9 19 25 5 16 30 27 7 12 10 20 17 31 8 21 18 22 23 24]. Applying rule INVERSE to sequence 'seqbin_31_trans' will recreate sequence 'seqbin_31'.

It should be clear that absolute synchronization of sequences is required in applying the transposition rules.

The Word Method

One problem with using LFSR related methods for generating Transposition Rules is that it can only generate Rules of length $(n^P-1)$ or in the binary case $(2^P-1)$ when the LFSR has shift registers with p elements. The inventor has demonstrated in the earlier cited Provisional Patent Application that one can use the so called 'word' method to extend the sequence with one symbol or the number of 'words' with one more. In that case the number of words is a multiple of n. Or in the binary case a multiple of 2. This is advantageous in some applications. An aspect of the present invention is to generate a transposition rule that can transpose sequences with an even number of symbols.

The invention of the 'word' method to generate binary sequences of even length is described in detail in U.S. Provisional Patent Application No. 60/695,317 filed on Jun. 30, 2005 entitled CREATION AND DETECTION OF BINARY AND NON BINARY PSEUDO-NOISE SEQUENCES NOT USING LFSR CIRCUITS. One example will be repeated here for illustrative purposes only.

In this example unique 4-bits binary words are used in such a way that the last three bits of a word are identical to the first three bits of a next word. For instance the first bit of each word will also be a bit in the sequence. There are of course 16 4-bit words. There are many ways to create partial solutions wherein less than 16 words are used. Well known solutions are pseudo-random sequences, formed in such a way that [0 0 0 0] or [1 1 1 1] are not used. In that case the resulting sequence will have a length of 15 bits.

There is at least one way to create a solution of 16 words, which is shown in the following table.

|  | b1 | b2 | b3 | b4 |  |  |  |  |  |  |  |  |  |  |  | dec |
|---|---|---|---|---|---|---|---|---|---|---|---|---|---|---|---|---|---|
| word1 | 1 | 1 | 1 | 1 |  |  |  |  |  |  |  |  |  |  |  | 15 |
| word2 |  | 1 | 1 | 1 | 0 |  |  |  |  |  |  |  |  |  |  | 14 |
| word3 |  |  | 1 | 1 | 0 | 1 |  |  |  |  |  |  |  |  |  | 13 |
| word4 |  |  |  | 1 | 0 | 1 | 1 |  |  |  |  |  |  |  |  | 11 |
| word5 |  |  |  |  | 0 | 1 | 1 | 0 |  |  |  |  |  |  |  | 6 |
| word6 |  |  |  |  |  | 1 | 1 | 0 | 0 |  |  |  |  |  |  | 12 |
| word7 |  |  |  |  |  |  | 1 | 0 | 0 | 1 |  |  |  |  |  | 9 |
| word8 |  |  |  |  |  |  |  | 0 | 0 | 1 | 0 |  |  |  |  | 2 |
| word9 |  |  |  |  |  |  |  |  | 0 | 1 | 0 | 1 |  |  |  | 5 |
| word10 |  |  |  |  |  |  |  |  |  | 1 | 0 | 1 | 0 |  |  | 10 |
| word11 |  |  |  |  |  |  |  |  |  |  | 0 | 1 | 0 | 0 |  | 4 |
| word12 |  |  |  |  |  |  |  |  |  |  |  | 1 | 0 | 0 | 0 | 8 |
| word13 |  |  |  |  |  |  |  |  |  |  |  |  | 0 | 0 | 0 | 0 | 0 |
| word14 |  |  |  |  |  |  |  |  |  |  |  |  |  | 0 | 0 | 0 | 1 | 1 |
| word15 |  |  |  |  |  |  |  |  |  |  |  |  |  |  | 0 | 0 | 1 | 1 | 3 |
| word16 |  |  |  |  |  |  |  |  |  |  |  |  |  |  |  | 0 | 1 | 1 | 1 | 7 |
| seq16 | 1 | 1 | 1 | 1 | 0 | 1 | 1 | 0 | 0 | 1 | 0 | 1 | 0 | 0 | 0 | 0 |  |

The 4-bit words are shown as decimal numbers in the table in the column under 'dec'. This column contains 16 numbers, including 0. It may be considered as a sequence generator with no forbidden state. In order to make the column a valid transposition rule, all numbers have to be increased with 1. The transposition rule is then: trans_16=[16 15 14 12 7 13 10 3 6 11 5 9 1 2 4 8].

The inverse rule is: inv_trans_16=[13 14 8 15 11 9 5 16 12 7 10 4 6 3 2 1].

Superimposing Different Transposition Rules

It should be clear that it is possible to 'superimpose' different transposition rules on a sequence. Additional security may be obtained by using transposition rules of different lengths. For instance a sequence of 32 symbols can be broken up in two contiguous sequences of length 7 and 25. As will be shown as another aspect of the present invention one can generate transposition rules of length 25 by using multi-valued methods. A transposition rule of length 7 can be generated by for instance a 3-element LFSR. And a 32 symbol transposition rule can be generated by a 5-bit word method.

One way to create a super-imposed method is to transpose the first 7 symbols of a 32 symbol sequence with a length 7 rule. Then transpose the remaining 25 symbols with a 25 length rule. And next transpose the combined transposed sequences with a 32 length rule.

Another way to create a super-imposed transposition method is to first transpose the 32 symbol sequence with a length 32 rule and then execute the 7 symbol and the 25 symbol transposition. All transpositions according to the present invention are reversible if the transposed sequence remains synchronized with the original 'not transposed' sequence. A sequence that was enciphered by using superimposed rules can be recovered in its original form by applying the inverses of each rule in reverse order of their application.

Ternary Transposition Rules

Another aspect of the present invention is the creation of transposition rules based on generating ternary or 3-valued pseudo-noise or pseudo-noise like sequences.

The inventor has shown in U.S. Non-Provisional patent application Ser. No. 10/935,960, filed on Sep. 8, 2004, entitled TERNARY AND MULTI-VALUE DIGITAL SCRAMBLERS, DESCRAMBLERS AND SEQUENCE GENERATORS which is incorporated herein by reference in its entirety, how one can generate ternary or 3-valued maximum length sequences with LFSR methods. Consequently, as was shown in U.S. Provisional Patent Application No. 60/695,317 filed on Jun. 30, 2005 entitled CREATION AND DETECTION OF BINARY AND NON BINARY PSEUDO-NOISE SEQUENCES NOT USING LFSR CIRCUITS, all consecutive 'words' formed by the content of the ternary shift register will be unique and non-repeating for $(3^P-1)$ words. The factor p is the length of the shift register.

Figure 9:
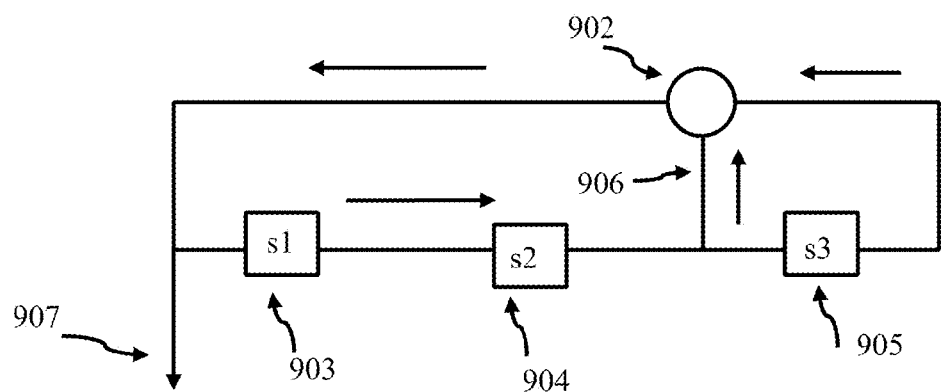
FIG. 9 is the diagram of an LFSR based sequence generator

The following illustrative example of a transposition rule base on a ternary LFSR generated m-sequence is provided. A ternary LFSR based sequence generator is shown in FIG. 9. The shift register comprises 3 elements of which each can hold an element with one of three states. The initial state of elements 903, 904 and 905 is [0 1 2]. The truth table of the applied ternary logic function in device 902 is 'ter1' and is shown in the following table:

| ter1 | 0 | 1 | 2 |
|---|---|---|---|
| 0 | 0 | 2 | 1 |
| 1 | 1 | 0 | 2 |
| 2 | 2 | 1 | 0 |

The truth table is non-commutative. The columns of the truth table of 'ter1' are determined by the output signals provided by the shift register element 905. The transposition rule is formed by the decimal value of each word formed by the content of the shift register at each different and consecutive state of the LFSR.

The generated sequence by the circuit of FIG. 9. is seq3=[2 2 2 0 0 1 0 1 2 1 1 2 0 1 1 1 0 0 2 0 2 1 2 2 1 0] and has a length of 26=(27−1) symbols. The rule formed by the consecutive states of the LFSR is: Rule3=[5 19 24 26 8 2 9 3 10 21 16 14 22 7 11 12 13 4 1 18 6 20 15 23 25 17]. The inverting rule is [19 6 8 18 1 21 14 5 7 9 15 16 17 12 23 11 26 20 2 22 10 13 24 3 25 4].

The forbidden state of this circuit is [0 0 0]. So the decimal number 0 will not occur in the transposition rule. One can create additional rules by either changing the initial state of the LFSR or by repeatedly applying the rule on itself Applying the rule once upon itself will create [8 1 23 17 3 19 10 24 21 6 12 7 20 9 16 14 22 26 5 4 2 18 11 15 25 13].

Elsewhere, such as in U.S. Non-Provisional patent application Ser. No. 10/935,960, filed on Sep. 8, 2004, entitled TERNARY AND MULTI-VALUE DIGITAL SCRAMBLERS, DESCRAMBLERS AND SEQUENCE GENERATORS which is hereby incorporated by reference herein in its entirety, the inventor has shown that by using different ternary logic functions in LFSRs additional ternary m-sequences can be created. These additional ternary m-sequences can in principle also be used to create orthogonal transposition rules. One potential problem can occur if the all 0 state is not the forbidden state. In that case the all 0 word is allowed and will be a transposition state. Because it is assumed that the sequences to be transposed and the transposed sequences start at position 1, the occurrence of a position 0 is problematic.

The following illustrative example will be used to demonstrate how the potential problem can be addressed.

Assume that an LFSR as shown in FIG. 9 will be applied, with the device 902 executing ternary logic function 'ter2' of which the truth table is shown in the following table.

| ter2 | 0 | 1 | 2 |
|---|---|---|---|
| 0 | 1 | 0 | 2 |
| 1 | 2 | 1 | 0 |
| 2 | 0 | 2 | 1 |

The LFSR state [1 1 1] equivalent with decimal value 13 is the forbidden state while [0 0 0] is allowed and will occur. Starting with [0 1 2] the following 26 unique words or represented by the shift register content will be generated and shown in the following table. The decimal equivalent value of the ternary words is also included.

| word | | | dec |
|---|---|---|---|
| 0 | 1 | 2 | 5 |
| 0 | 0 | 1 | 1 |
| 0 | 0 | 0 | 0 |
| 1 | 0 | 0 | 9 |
| 1 | 1 | 0 | 12 |
| 2 | 1 | 1 | 22 |
| 1 | 2 | 1 | 16 |
| 2 | 1 | 2 | 23 |
| 0 | 2 | 1 | 7 |
| 2 | 0 | 2 | 20 |
| 2 | 2 | 0 | 24 |
| 0 | 2 | 2 | 8 |
| 1 | 0 | 2 | 11 |
| 2 | 1 | 0 | 21 |
| 2 | 2 | 1 | 25 |
| 2 | 2 | 2 | 26 |
| 1 | 2 | 2 | 17 |
| 1 | 1 | 2 | 14 |
| 0 | 1 | 1 | 4 |
| 1 | 0 | 1 | 10 |
| 0 | 1 | 0 | 3 |
| 2 | 0 | 1 | 19 |
| 0 | 2 | 0 | 6 |
| 0 | 0 | 2 | 2 |
| 2 | 0 | 0 | 18 |
| 1 | 2 | 0 | 15 |

There are several ways to make this a valid transposition rule. One way is to replace 0 with the forbidden state (which represents 13). The transposition rule then becomes: [5 1 13 9 12 22 16 23 7 20 24 8 11 21 25 26 17 14 4 10 3 19 6 2 18 15]. The following illustrative examples will show the results of several transposition rules. In the first example the ternary m-sequence generated by the circuit of FIG. 9 with 902 realizing function 'ter2' will be transposed by the rule generated by the circuit of FIG. 9 with 902 realized by 'ter1' and initial state [0 1 2]. The LFSR has shift register elements 903, 904 and 905; a tap 906; and an output 907. The ternary m-sequence to be transposed is: [0 0 1 1 2 1 2 0 2 2 0 1 2 2 2 1 1 0 1 0 2 0 0 2 1 0]. The applied transposition rule is: Rule3=[5 19 24 26 8 2 9 3 10 21 16 14 22 7 11 12 13 4 1 18 6 20 15 23 25 17] which is generated by the circuit of FIG. 9 with device 902 realized by ternary function 'ter1'. The transposed sequence is: [2 1 2 0 0 0 2 1 2 2 2 1 2 0 2 0 1 2 1 0 0 1 0 2 0 1 1].

Figure 10:
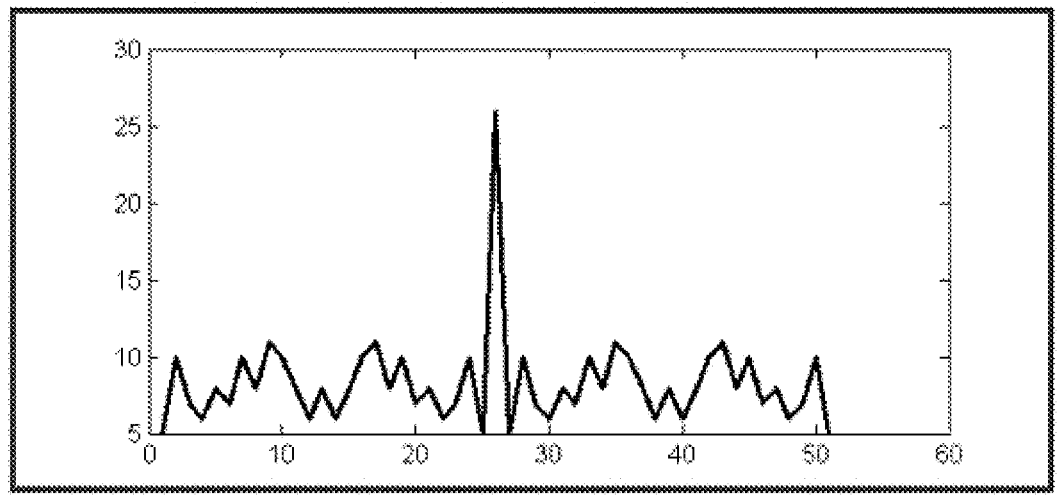
FIG. 10 is the auto-correlation graph of a transposed 26 symbol sequence.
Figure 11:
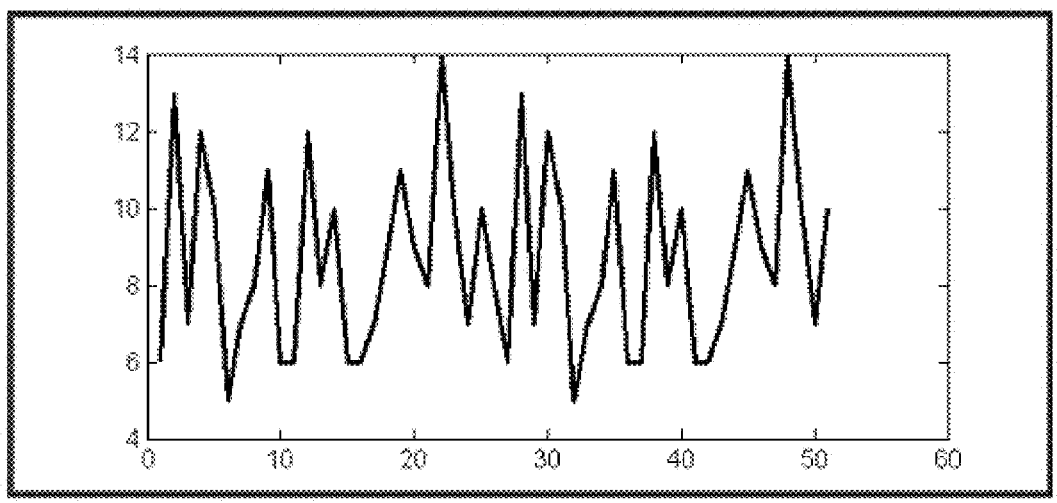
FIG. 11 is the cross-correlation graph of an original m-sequence with its transposed sequence.

The auto-correlation graph of the transposed sequence is shown in FIG. 10. The cross-correlation graph of the original sequence with the transposed sequence is shown in FIG. 11.

Figure 12:
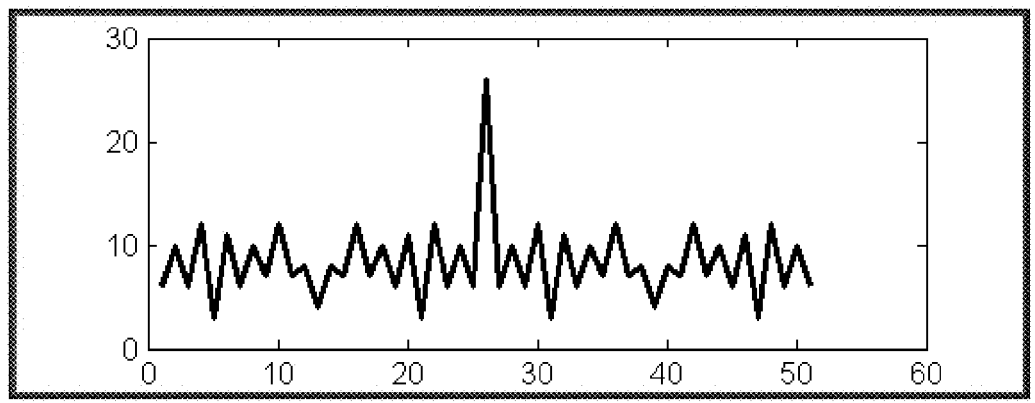
FIG. 12 is the auto-correlation graph of a transposed ternary m-sequence which is transposed again with the 'modulo-n+1' rule.

It is one aspect of the present invention to create a new transposition rule from an existing rule of n positions, by determining the modulo-n residue of all rule values and adding 1. Applying this method to the illustrative ternary example will create the rule: [6 20 25 1 9 3 10 4 11 22 17 15 23 8 12 13 14 5 2 19 7 21 16 24 26 18]. While it appears to be easy to determine this rule from its source, the same is not true for the transposed sequences. Applying the 'modulo-n and plus-1' rule to the sequence that was the result of the previous transposition will create the sequence: [0 0 1 2 2 2 2 0 1 0 2 0 2 1 2 0 2 0 1 0 2 1 1 0 1 1]. The auto-correlation graph of this sequence is shown in FIG. 12.

Figure 13:
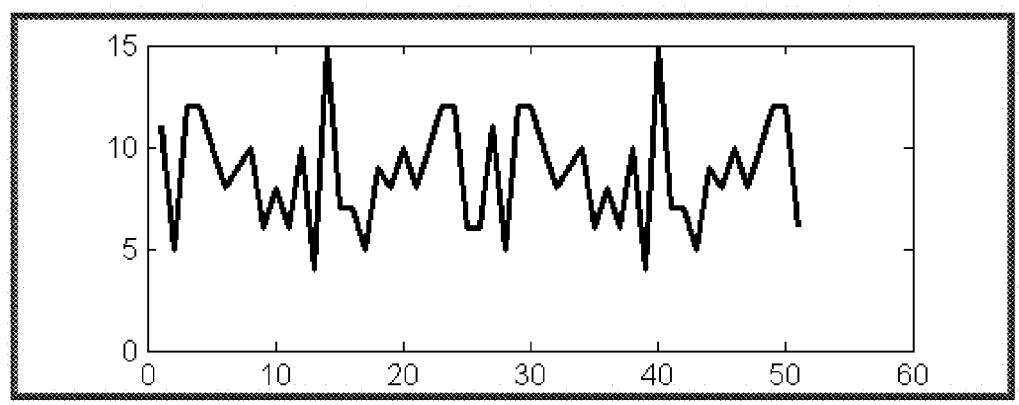
FIG. 13 is the cross-correlation graph of the transposed ternary m-sequence with the sequence created by 'modulo-n+1' transposition of this sequence.
Figure 14:
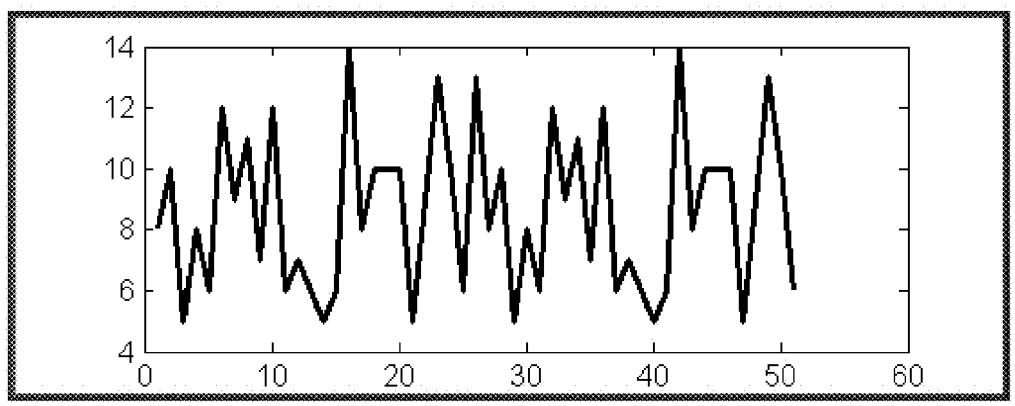
FIG. 14 is the cross-correlation graph of the original ternary m-sequence with the 'modulo-n+1' transposition of the transposed ternary m-sequence.

There are no obvious recognition or synchronization points between this newly transposed sequence and the previous one. FIG. 13 shows the cross-correlation graph of the transposed sequence with the sequence created by transposition the transposed sequence again with the 'modulo-n+1' rule. There is no clear alignment between the two sequences. FIG. 14 shows the cross-correlation of the sequence created by the 'modulo-n+1' rule with the original ternary m-sequence. Also in this case there is no clear alignment.

The application of the transposition rules derived from ternary LFSR based sequences to other LFSR generated ternary sequences is for illustrative purposes only as to make sure that the sequences as well as rules have the same number of positions and to demonstrate that apparent positional relationships (as shown in correlation graphs) will be broken up by the transposition rules. The transpositions of course work for any sequence of n-valued symbols. The requirement is that one can create a sequence of $(n^p-1)$ n-valued symbols or $n^p$ n-valued symbols from words of p n-valued symbols in such a way that each word of p consecutives n-valued symbols in the sequence are unique with regards to one another. This is a different way to say that the sequences should be pseudo-random.

One should make sure that the sequences to be transposed contain sufficient symbols to apply the relevant transposition rules. When a sequence does not contain enough symbols one may have to stuff or pad a sequence with additional symbols when a transposition rule requires additional symbols.

Sequences of Length $3^P$

In the cited US Provisional Patent Application related to generating sequences not using LFSR methods the inventor has shown it to be possible to generate n-valued sequences of length $n^p$ wherein words are used of p n-valued symbols. It is possible to arrange the words in such a way that for instance the last (p−1) symbols of a word coincide with the first (p−1) symbols of the next word. It is then possible to use all $n^p$ words just once in creating a sequence. One can actually recreate the used words from the sequence by starting to take the first p symbols, shift one position and take again the p consecutive symbols, etc. Each word is then unique. One can create words of more than p symbols. In that case all words will be unique. However when sorted these words (of more than p symbols) do not have to form a mainly contiguous series of numbers, with only the forbidden word(s) missing.

It was shown in the cited patent application that the auto-correlation of these maximum length sequences can be attractive, by having one central high peak and much lower non-peak values. One of these sequences of length 27 will be used as an illustrative example to generate transposition rules. The sequence is [0 0 0 1 0 1 1 1 2 1 0 2 0 0 2 1 2 0 2 2 2 0 1 2 2 1 1]. This sequence of 27 ternary symbols was created by the 'word' method using 27 different words of 3 symbols. This sequence can be translated into a rule of 27 different decimal numbers: [0 1 3 10 4 13 14 16 21 11 6 18 2 7 23 15 20 8 26 24 19 5 17 25 22 12 9]. Because of the nature of the method to generate the sequence all 27 words (including all 0s) will be used. Consequently one has to add 1 to all numbers to create a transposition rule: [1 2 4 11 5 14 15 17 22 12 7 19 3 8 24 16 21 9 27 25 20 6 18 26 23 13 10]. All previously mentioned methods (inverting, shifting positions, repeated application and 'modulo-n+1') can be applied using this rule.

For illustrative purposes the initial state of sequences in the examples were selected as [0 0 0]. This means that a self mapping first state of the transposition will be created. It should be clear that one may start with a different state to prevent the first state to be self mapping.

Hiding One Sequence in Another Sequence

As an illustrative example it is shown what will happen when the sequence is analyzed using words of 4 elements rather than 3. The created rule will then be: Rule4=[2 6 19 58 14 43 49 67 39 38 35 26 79 77 71 51 72 55 5 15 47 61 21 64 30 9 27]. This rule is not complete. The rule can not be applied in 'transpose from' mode without first generating a complete 79 symbols originating sequence. However in the 'transpose to' mode this rule can be used to hide symbols in another sequence in a recoverable way.

The highest number in Rule4 is 79. Assume, as before, that the starting position of a transposition is 1. Assume also that a sequence [1 2 3 4 5 6 7 8 9 10 11 12 13 14 15 16 17 18 19 20 21 22 23 24 25 26 27] is going to be 'hidden' in a sequence of all 0s. Clearly this is not really hiding the sequence. However for illustrative purposes the symbols to be 'hidden' need to stand out. So a sequence of 27 different symbols is going to be transposed (or is going to overwrite or replace) 27 0s in a sequence of 79 0s. The sequence with the second sequence transposed into it will be: [0 1 0 0 19 2 0 0 26 0 0 0 5 20 0 0 3 0 23 0 0 0 0 12 27 0 0 25 0 0 0 0 11 0 0 10 9 0 0 0 6 0 0 0 21 0 7 0 16 0 0 0 18 0 0 4 0 0 22 0 0 24 0 0 8 0 0 0 15 17 0 0 0 0 14 0 13]. By inverting the Rule4 the original sequence can be recovered.

Another 'hiding' scheme is provided as an illustrative example. The following ternary sequence Original=[0 0 0 1 0 1 1 1 2 1 0 2 0 0 2 1 2 0 2 2 2 0 1 2 2 1 1] with 27 elements will be hidden in a ternary sequence Long79=[0 1 0 1 1 1 2 1 0 2 0 0 2 1 2 0 2 2 2 0 1 2 2 1 1 0 0 0 1 0 2 2 2 0 2 0 0 2 1 1 1 0 1 1 2 1 2 0 1 2 2 1 0 0 0 2 0 0 1 0 1 2 1 2 0 1 1 1 2 2 2 0 2 2 1 1 0 2 1] with 79 elements. By applying Rule4 in 'transpose to' mode the sequence Original is transposed into Long79 with resulting sequence Hide=[0 0 0 1 2 0 2 1 1 2 0 0 2 0 2 0 2 2 0 0 1 2 2 1 1 2 1 0 1 2 2 2 2 0 0 0 0 1 2 1 1 0 1 1 2 1 2 0 1 2 1 1 0 0 0 2 0 1 1 0 0 2 1 2 0 1 1 1 2 2 2 2 2 2 1 1 0 2 0]. By applying the inverse of Rule4 in 'transpose to' mode one can recover Original from sequence Hide.

Figure 15:
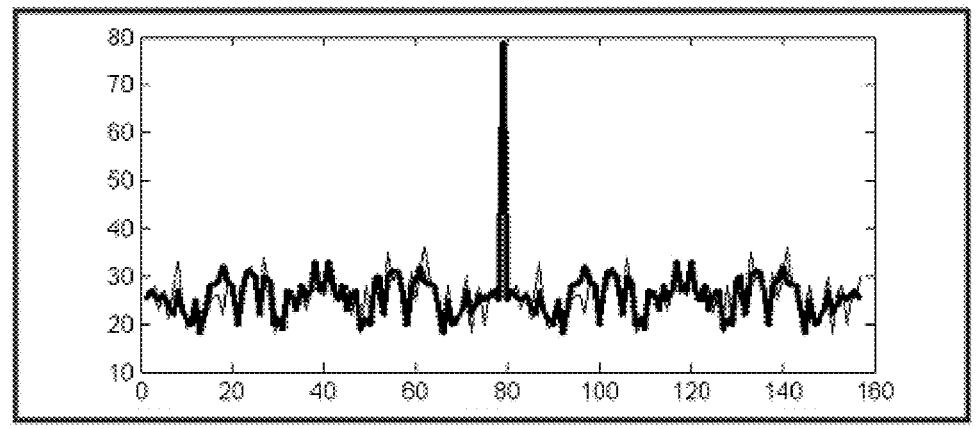
FIG. 15 shows the combined auto-correlation graph of a sequence combined with the cross-correlation graph of this sequence with another sequence.

The effect of hiding a smaller sequence by transposition in a larger one is shown in FIG. 15. Herein the combined auto-correlation of the sequence Long79 in thick line and the cross-correlation of Long79 with sequence Hide in thin line are shown. The effect of the Original sequence on the overall cross-correlation is minimal. The peak of the cross-correlation coincides with the peak of the auto-correlation. Its peak is about at 65, and is lower than the 79 of the auto-correlation. But detection by correlating Hide with Long79 is still fairly simple. One can do of course additional transpositions on the sequence Hide.

One can hide even one element in a multi-element sequence.

The hiding technique was demonstrated in an illustrative example using ternary sequences. It should be clear that the method, being another aspect of the present invention, can be applied using any n-valued sequence to generate the hiding rule. Also the hiding sequence and the sequence to be hidden can be any n-valued sequence. Clearly the length of the sequences and the statistical make-up of the sequences and the hiding rule will influence how well a sequence can be hidden.

Using 4-Valued Sequences

For illustrative purposes it will be shown that 4-valued sequences can also be applied to create orthogonal transposition rules. Using 4-valued 'word' methods one can create orthogonal transposition rules of different length. One can for instance create m-sequences of length ($4^P-1$). Herein p is the length of the applied words (or the length of an LFSR 4-valued shift register. Some of the sequences will have the desirable 2-level auto-correlation graph. For the illustrative example a rule created by 2 4-valued element words will be used.

One sequence thus generated is the 16 elements sequence [2 0 0 1 1 0 3 3 2 3 0 2 1 3 1 2]. One can derive a transposition rule from this sequence by first putting a copy of the first element of the sequence (2) at the end of the sequence and by considering each of 2 consecutive 4-valued elements representing a decimal value. In 4-valued representation the rule then is: [2 0; 0 0; 0 1; 1 1; 1 0; 0 3; 3 3; 3 2; 2 3; 3 0; 0 2; 2 1; 1 3; 3 1; 1 2; 2 2] or in decimal form: [8 0 1 5 4 3 15 14 11 12 2 9 7 13 6 10]. In order to make this a transposition rule working from origin 1 a 1 has to be added to all numbers thus creating: Rule42=[9 1 2 6 5 4 16 15 12 13 3 10 8 14 7 11].

Figure 16:
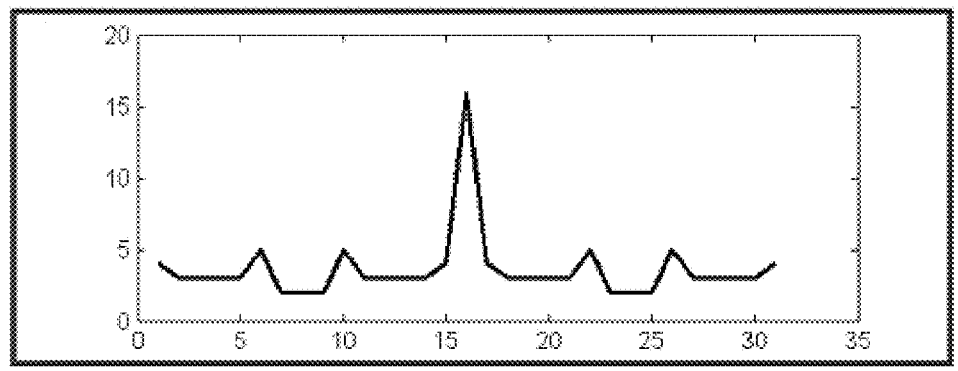
FIG. 16 shows the auto-correlation graph of a 16 element 4-valued sequence
Figure 17:
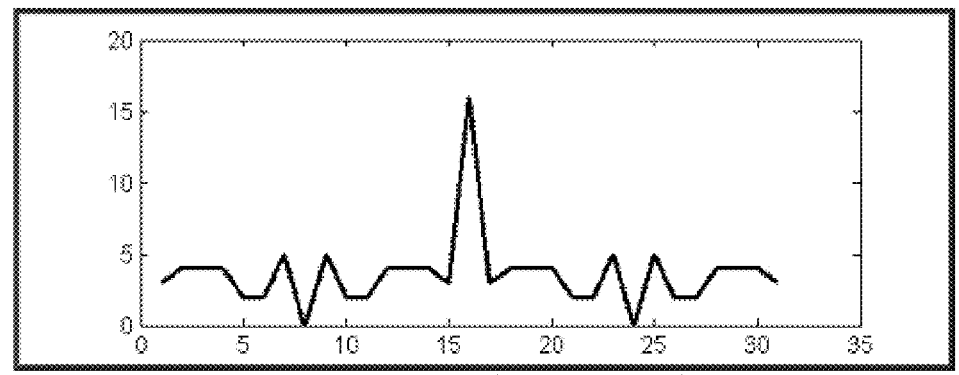
FIG. 17 shows the auto-correlation graph of a transposed sequence
Figure 18:
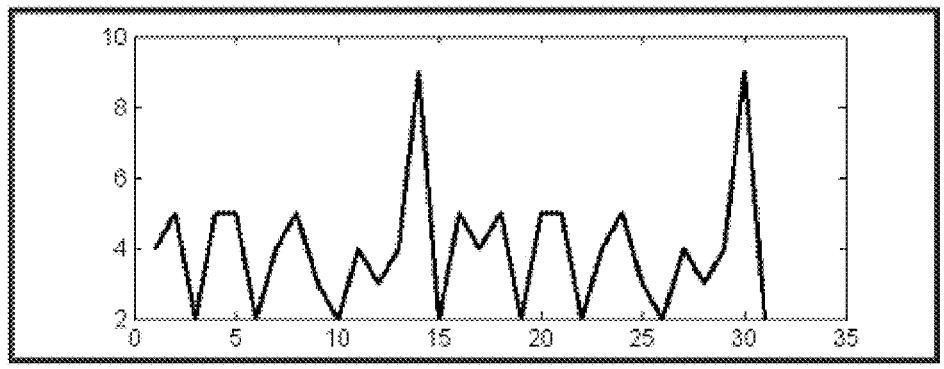
FIG. 18 shows the cross-correlation graph of a sequence with its transposed sequence.

Another 16 elements sequence is [0 0 1 0 2 2 1 1 2 0 3 3 1 3 2 3]. An auto-correlation graph of this sequence is shown in FIG. 16. Using rule Rule42 in 'transpose from' mode on the sequence will create the sequence [2 0 0 2 2 0 3 2 3 1 1 0 1 3 1 3]. The auto-correlation of that sequence is shown in FIG. 17. The cross-correlation of the original sequence with the transposed sequence is shown in FIG. 18. It should be apparent to one of ordinary skills in the art that any reversible n-valued pseudo-random sequence can be used to transpose and reverse a transposed sequence of symbols.

Other Applications of Transposition Rules

The transposition rules as developed in the present invention transpose symbols from one position in a sequence to another position which sometimes can be the same position. It is another aspect of the present invention to interpret the generated rule of decimal numbers as actual positions. The numbers represent individual slots or positions in a series or frame of positions. A slot or a position may represent a specific frequency band or a time slot. Each position or slot has a specific number. While in a transposition one changes the position of a symbol, in this aspect of the invention a symbol is exchanged with what will be called a 'user'. The 'user' is in essence a message or part of a message that requires for instance a 'time-slot', a pulse, an assigned bandwidth or an assigned code to transmit the message or part of a message. The transposition rule [a b c d] then has the following meaning: there are 4 users; each user will be assigned a transmission resource (potentially for a finite time). There are 4 resources named 'a', 'b', 'c' and 'd'. User 1 is assigned resource 'a'. User 2 is assigned resource 'b'. User 3 is assigned resource 'c'. User 4 is assigned resource 'd'. In general one will assign a single resource (or a series of resources that may be considered a single resource) to a single user. In order to prevent interference one will want to prevent multiple users having access to the same resource at the same time. This concept is known as orthogonality. It is possible to assign more resources to a single user. As long as orthogonality is observed having access to more resources should not be a problem.

The following illustrative example will show how a transposition rule (in this case the 4-valued sequence based Rule42) can be applied in a time-hopping system. In a time-hopping system a transmission period is divided in a frame with a discrete number of time slots. A user is represented by a sequence of pulses, wherein each user has at least one pulse in a time-slot in each timeframe. In general one wants each user to occupy a pulse in a different time slot in each consecutive timeframe. Assuming that there are an equal number of users and time-slots it should be clear that the assignment rule should be orthogonal (or non-conflicting).

Figure 19:
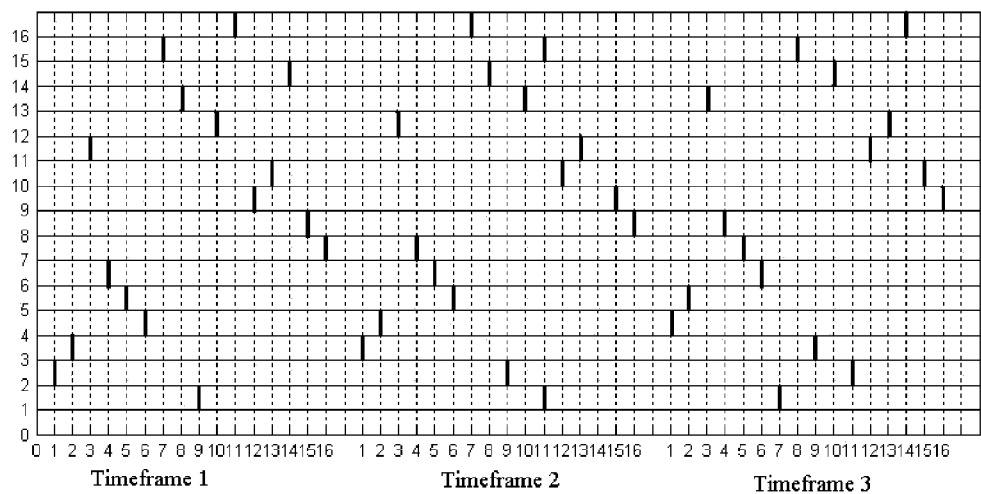
FIG. 19 shows a pulse train diagram for time hopping

Assume that there are 16 time slots and 16 users. The rule Rule42=[9 1 2 6 5 4 16 15 12 13 3 10 8 14 7 11] can then be applied to assign time-slots. Because it may be required that the assigned time-slots differ in each frame additional assignment rules are then required. One can use different assignment rules generated by for instance other 16 element 4-valued sequences, generated by 2-element 4 valued words. The advantage is that unrelated sequences can be used. One can also derive the next to be applied rule from the present rule. One way derive the next assignment rule from the present is by shifting all elements one position to the right and move the last element to the first position. This will create Rule42sr1= [11 9 1 2 6 5 4 16 15 12 13 3 10 8 14 7] followed by Rule42sr2=[7 11 9 1 2 6 5 4 16 15 12 13 3 10 8 14]. One can create 16 different consecutive assignment rules. The results of the first 3 rules are shown in the pulse diagram with three consecutive timeframes in FIG. 19. The x-axis shows three timeframes with 16 time-slots. The y-axis shows the users. The thick short vertical lines tell which time-slot is assigned to which user. Clearly this scheme is orthogonal. It repeats itself after 16 timeframes. Also the relations between users and time-slots become predictable.

Figure 20:
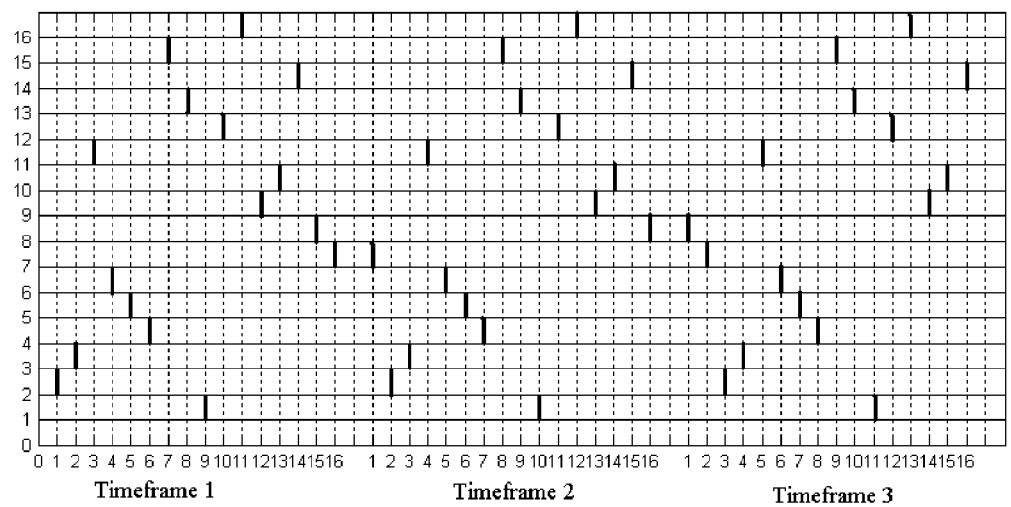
FIG. 20 shows another pulse train diagram

Another way to create orthogonal 'hopping' or placement rules is by adding a number 'modulo-16+1' to the elements of a previous rule, which makes each position shift by 1 in each next timeframe. The first 3 timeframes as a result of this method are shown in FIG. 20. While the patterns are orthogonal in each timeframe they are following a clear pattern. One can add also odd numbers to make the jumps seemingly less predictable.

Another way to create 'n' seemingly random 'hopping' patterns for 'n' users is another aspect of the present invention. The method is explained by using as an illustrative example based on a 16 elements 4-valued sequence created by the 2 4-valued elements 'word' method. This sequence, taking all consecutive 2 elements words and extending the sequence with a copy of the first element, can create a sequence of 16 different decimal numbers. As there is no forbidden state among the words the lowest decimal number in the sequence is 0 and the highest is 15. To make the decimal numbers equivalent to positions each number is increased by one. One can thus generate thousands and thousands of different decimal sequences. The next step is to use a generated rule to create 16 additional rules. This is done by assuming that a generated sequence may be considered to be a sequence as well as a rule. So one can actually 'transpose' the elements of a rule by the rule. For illustrative purposes it is assumed that the rule executes the 'transpose from' method.

A sequence of 16 different symbols can have 16 orthogonal sequences configurations, as after 16 symbols a repeat of symbols has to take place. A successful sequence is Rule44=[7 10 8 15 12 14 6 5 3 11 9 4 16 13 1 2]. Applying this rule first upon itself and then on its results will generate:

| rule | 1 7 | 2 10 | 3 8 | 4 15 | 5 12 | 6 14 | 7 6 | 8 5 | 9 3 | 10 11 | 11 9 | 12 4 | 13 16 | 14 13 | 15 1 | 16 2 |
|---|---|---|---|---|---|---|---|---|---|---|---|---|---|---|---|---|
| 1 | 6 | 11 | 5 | 1 | 4 | 13 | 14 | 12 | 8 | 9 | 3 | 15 | 2 | 16 | 7 | 10 |
| 2 | 14 | 9 | 12 | 7 | 15 | 16 | 13 | 4 | 5 | 3 | 8 | 1 | 10 | 2 | 6 | 11 |
| 3 | 13 | 3 | 4 | 6 | 1 | 2 | 16 | 15 | 12 | 8 | 5 | 7 | 11 | 10 | 14 | 9 |
| 4 | 16 | 8 | 15 | 14 | 7 | 10 | 2 | 1 | 4 | 5 | 12 | 6 | 9 | 11 | 13 | 3 |
| 5 | 2 | 5 | 1 | 13 | 6 | 11 | 10 | 7 | 15 | 12 | 4 | 14 | 3 | 9 | 16 | 8 |
| 6 | 10 | 12 | 7 | 16 | 14 | 9 | 11 | 6 | 1 | 4 | 15 | 13 | 8 | 3 | 2 | 5 |
| 7 | 11 | 4 | 6 | 2 | 13 | 3 | 9 | 14 | 7 | 15 | 1 | 16 | 5 | 8 | 10 | 12 |
| 8 | 9 | 15 | 14 | 10 | 16 | 8 | 3 | 13 | 6 | 1 | 7 | 2 | 12 | 5 | 11 | 4 |
| 9 | 3 | 1 | 13 | 11 | 2 | 5 | 8 | 16 | 14 | 7 | 6 | 10 | 4 | 12 | 9 | 15 |
| 10 | 8 | 7 | 16 | 9 | 10 | 12 | 5 | 2 | 13 | 6 | 14 | 11 | 15 | 4 | 3 | 1 |
| 11 | 5 | 6 | 2 | 3 | 11 | 4 | 12 | 10 | 16 | 14 | 13 | 9 | 1 | 15 | 8 | 7 |
| 12 | 12 | 14 | 10 | 8 | 9 | 15 | 4 | 11 | 2 | 13 | 16 | 3 | 7 | 1 | 5 | 6 |
| 13 | 4 | 13 | 11 | 5 | 3 | 1 | 15 | 9 | 10 | 16 | 2 | 8 | 6 | 7 | 12 | 14 |
| 14 | 15 | 16 | 9 | 12 | 8 | 7 | 1 | 3 | 11 | 2 | 10 | 5 | 14 | 6 | 4 | 13 |
| 15 | 1 | 2 | 3 | 4 | 5 | 6 | 7 | 8 | 9 | 10 | 11 | 12 | 13 | 14 | 15 | 16 |
| 16 | 7 | 10 | 8 | 15 | 12 | 14 | 6 | 5 | 3 | 11 | 9 | 4 | 16 | 13 | 1 | 2 |
| 17 | 6 | 11 | 5 | 1 | 4 | 13 | 14 | 12 | 8 | 9 | 3 | 15 | 2 | 16 | 7 | 10 |

By applying the transposing rule on its result one then achieves the result as shown in the table. After 16 transpositions, i.e. from the $17^{th}$ transposition forward, the results will repeat. This means that 16 orthogonal positions are available in a frame of 16 positions, and that also 16 superframes of 16 individual frames generated by a repeated transposition rule upon itself, wherein the transposition rule is determined from a pseudo-random 4-valued sequence, determined from 2-symbol state words, are orthogonal.

One can then create 16 superframes, each superframe having 16 frames and each frame having 16 positions, wherein a user or a channel is orthogonal on any other user for the duration of the 16 superframes, when all the superframes described by the table are synchronized.

A position in a frame can signify a position in time or a frequency.

It is possible that frames are not synchronized, in the sense that frames may start at the same moment, but that each superframe can start at a any frame compared to other superframes. A measure of overlap can be to combine 2 identical superframes of 16 frames into 32 frames and check the number of frames that a shifted superframe can have in common with this combined superframe. In the present example the highest possible number of frames in common that a shifted superframe can have in common with part of two combined identical superframes is 4. One can check this with a computer program. This means that at least 12 frames are different. This is a significant enough difference to achieve discrimination between superframes, even if the superframes are not synchronized.

One can actually find a better performing rule under this example: rule=[12 14 6 5 3 11 9 4 16 13 1 2 7 10 8 15]. This is a shifted version of the earlier rule. Unsynchronized superframes under this rule have only 3 frames in common.

Another example of the method of creating superframes of hopping or transposition rules is provided for a ternary case. A 3-element ternary LFSR can generate the following ternary pseudo-random sequence of 26 ternary elements: out3=[2 1 1 1 2 0 0 1 1 0 1 0 2 1 2 2 2 1 0 0 2 2 0 2 0 1]. By extending the sequence by the two first symbols one can create from overlapping words of 3 symbols the decimal sequence: [22 13 14 15 18 1 4 12 10 3 11 7 23 17 26 25 21 9 2 8 24 20 6 19 5 16]. One can apply this rule upon itself for 26 times and create 26 superframes of 26 frames. By shifting the rule, by moving the last element in the first position one can create a new rule. This is identical to starting the LFSR with another initial state. By using a computer program, or manually if one so desires, one can then select the rule that creates 26 different and orthogonal superframes. The result is shown in the following table:

| hopping rule based on 3-element ternary pseudo-random sequence ||||||||||||||||||||||||||
|---|---|---|---|---|---|---|---|---|---|---|---|---|---|---|---|---|---|---|---|---|---|---|---|---|---|
| 26 | 22 | 17 | 16 | 11 | 21 | 12 | 10 | 3 | 23 | 20 | 5 | 4 | 18 | 19 | 1 | 13 | 9 | 7 | 24 | 8 | 25 | 15 | 6 | 14 | 2 |
| 24 | 21 | 7 | 11 | 1 | 25 | 4 | 18 | 19 | 9 | 26 | 16 | 5 | 23 | 17 | 20 | 12 | 15 | 13 | 2 | 14 | 8 | 3 | 22 | 10 | 6 |
| 2 | 25 | 13 | 1 | 20 | 8 | 5 | 23 | 17 | 15 | 24 | 11 | 16 | 9 | 7 | 26 | 4 | 3 | 12 | 6 | 10 | 14 | 19 | 21 | 18 | 22 |
| 6 | 8 | 12 | 20 | 26 | 14 | 16 | 9 | 7 | 3 | 2 | 1 | 11 | 15 | 13 | 24 | 5 | 19 | 4 | 22 | 18 | 10 | 17 | 25 | 23 | 21 |
| 22 | 14 | 4 | 26 | 24 | 10 | 11 | 15 | 13 | 19 | 6 | 20 | 1 | 3 | 12 | 2 | 16 | 17 | 5 | 21 | 23 | 18 | 7 | 8 | 9 | 25 |
| 21 | 10 | 5 | 24 | 2 | 18 | 1 | 3 | 12 | 17 | 22 | 26 | 20 | 19 | 4 | 6 | 11 | 7 | 16 | 25 | 9 | 23 | 13 | 14 | 15 | 8 |
| 25 | 18 | 16 | 2 | 6 | 23 | 20 | 19 | 4 | 7 | 21 | 24 | 26 | 17 | 5 | 22 | 1 | 13 | 11 | 8 | 15 | 9 | 12 | 10 | 3 | 14 |
| 8 | 23 | 11 | 6 | 22 | 9 | 26 | 17 | 5 | 13 | 25 | 2 | 24 | 7 | 16 | 21 | 20 | 12 | 1 | 14 | 3 | 15 | 4 | 18 | 19 | 10 |
| 14 | 9 | 1 | 22 | 21 | 15 | 24 | 7 | 16 | 12 | 8 | 6 | 2 | 13 | 11 | 25 | 26 | 4 | 20 | 10 | 19 | 3 | 5 | 23 | 17 | 18 |
| 10 | 15 | 20 | 21 | 25 | 3 | 2 | 13 | 11 | 4 | 14 | 22 | 6 | 12 | 1 | 8 | 24 | 5 | 26 | 18 | 17 | 19 | 16 | 9 | 7 | 23 |
| 18 | 3 | 26 | 25 | 8 | 19 | 6 | 12 | 1 | 5 | 10 | 21 | 22 | 4 | 20 | 14 | 2 | 16 | 24 | 23 | 7 | 17 | 11 | 15 | 13 | 9 |
| 23 | 19 | 24 | 8 | 14 | 17 | 22 | 4 | 20 | 16 | 18 | 25 | 21 | 5 | 26 | 10 | 6 | 11 | 2 | 9 | 13 | 7 | 1 | 3 | 12 | 15 |
| 9 | 17 | 2 | 14 | 10 | 7 | 21 | 5 | 26 | 11 | 23 | 8 | 25 | 16 | 24 | 18 | 22 | 1 | 6 | 15 | 12 | 13 | 20 | 19 | 4 | 3 |
| 15 | 7 | 6 | 10 | 18 | 13 | 25 | 16 | 24 | 1 | 9 | 14 | 8 | 11 | 2 | 23 | 21 | 20 | 22 | 3 | 4 | 12 | 26 | 17 | 5 | 19 |
| 3 | 13 | 22 | 18 | 23 | 12 | 8 | 11 | 2 | 20 | 15 | 10 | 14 | 1 | 6 | 9 | 25 | 26 | 21 | 19 | 5 | 4 | 24 | 7 | 16 | 17 |
| 19 | 12 | 21 | 23 | 9 | 4 | 14 | 1 | 6 | 26 | 3 | 18 | 10 | 20 | 22 | 15 | 8 | 24 | 25 | 17 | 16 | 5 | 2 | 13 | 11 | 7 |
| 17 | 4 | 25 | 9 | 15 | 5 | 10 | 20 | 22 | 24 | 19 | 23 | 18 | 26 | 21 | 3 | 14 | 2 | 8 | 7 | 11 | 16 | 6 | 12 | 1 | 13 |
| 7 | 5 | 8 | 15 | 3 | 16 | 18 | 26 | 21 | 2 | 17 | 9 | 23 | 24 | 25 | 19 | 10 | 6 | 14 | 13 | 1 | 11 | 22 | 4 | 20 | 12 |
| 13 | 16 | 14 | 3 | 19 | 11 | 23 | 24 | 25 | 6 | 7 | 15 | 9 | 2 | 8 | 17 | 18 | 22 | 10 | 12 | 20 | 1 | 21 | 5 | 26 | 4 |
| 12 | 11 | 10 | 19 | 17 | 1 | 9 | 2 | 8 | 22 | 13 | 3 | 15 | 6 | 14 | 7 | 23 | 21 | 18 | 4 | 26 | 20 | 25 | 16 | 24 | 5 |
| 4 | 1 | 18 | 17 | 7 | 20 | 15 | 6 | 14 | 21 | 12 | 19 | 3 | 22 | 10 | 13 | 9 | 25 | 23 | 5 | 24 | 26 | 8 | 11 | 2 | 16 |

| hopping rule based on 3-element ternary pseudo-random sequence | | | | | | | | | | | | | | | | | | | | | | | | | |
|---|---|---|---|---|---|---|---|---|---|---|---|---|---|---|---|---|---|---|---|---|---|---|---|---|---|
| 5 | 20 | 23 | 7 | 13 | 26 | 3 | 22 | 10 | 25 | 4 | 17 | 19 | 21 | 18 | 12 | 15 | 8 | 9 | 16 | 2 | 24 | 14 | 1 | 6 | 11 |
| 16 | 26 | 9 | 13 | 12 | 24 | 19 | 21 | 18 | 8 | 5 | 7 | 17 | 25 | 23 | 4 | 3 | 14 | 15 | 11 | 6 | 2 | 10 | 20 | 22 | 1 |
| 11 | 24 | 15 | 12 | 4 | 2 | 17 | 25 | 23 | 14 | 16 | 13 | 7 | 8 | 9 | 5 | 19 | 10 | 3 | 1 | 22 | 6 | 18 | 26 | 21 | 20 |
| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
| 20 | 6 | 19 | 5 | 16 | 22 | 13 | 14 | 15 | 18 | 1 | 4 | 12 | 10 | 3 | 11 | 7 | 23 | 17 | 26 | 25 | 21 | 9 | 2 | 8 | 24 |

The unsynchronized superframes of this rule have a maximum of 4 frames in common when one compares a shifted superframe with 2 combined superframes. This means that without errors each superframes has at least 22 unique or orthogonal frames. After a 4-valued and a ternary example it should be clear that the method for creating hopping or transposition rules for superframes can be used with n-valued symbol sequences also.

According to another aspect of the present invention one can use the hopping or transposition rules to generate sequences of pulse trains, which will be used in a completely unsynchronized manner. This means that each user or channel may send a pulse train completely at random times. The rules are used in the following manner, using the 16 frame rule as an example. Each pulse train starts with a pulse and is followed by a number of time elements without any signal until a new pulse occurs. The distance or time period between the pulses is determined by a number in the transposition or hopping rule. The 16-valued rule rule=[12 14 6 5 3 11 9 4 16 13 1 2 7 10 8 15] can be used as: a train starts with a pulse and is followed by 12 time elements of no signal with a pulse after the $12^{th}$ time period when the previous pulse occurred. This is followed by 14 time periods of no signal and again a pulse occurs, etc. One can end the train with a pulse. One may also start the pulse train with a pulse. For instance one can apply the rule as: start a train with a pulse and consider the rule "number" as the position for the next pulse to occur following the present pulse. A rule "number" 1 then signifies the next position immediately following the present pulse. A pulse train is closed by a pulse as each pulse train according to the rules occupies exactly 137 time periods. Shift and matching of each of the pulse trains with a combined pulse train of two identical pulse trains will find 17 matching pulses if two pulse trains are identical and maximal 8 when they are not matching. One can improve the numbers by inversing pulses between +1 and −1 and thus reduce the matching pulses between shifted pulse trains to 6 under these rules.

Gold Sequences

In a co-pending US Application by the inventor entitled: SELF-SYNCHRONIZING GENERATION AND DETECTION OF SEQUENCES NOT USING LFSRS which is incorporated herein in its entirety, it is shown that Gold sequences, formed by combining pseudo random n-valued sequences formed from k n-valued symbol words can be used to from unique sequences of overlapping words of 2k n-valued symbols.

As an illustrative example of the method a set of ternary Gold sequences will be used. The following ternary m-sequence of length 80 can be generated by a ternary 4-element LFSR generator: [0 0 2 0 2 0 1 0 1 1 0 1 2 0 1 1 1 1 2 2 2 1 2 2 0 1 2 1 1 1 0 2 2 0 0 2 1 2 0 0 1 1 2 1 2 1 0 1 0 0 1 0 2 1 0 0 0 0 2 2 2 0 2 2 1 0 2 0 0 0 1 2 2 1 1 2 0 2 1 1]. A set of Gold sequences is formed by cyclically shifting and combining with the following 80 symbol ternary m-sequence: [1 2 1 0 1 1 0 0 1 0 0 0 1 2 1 2 2 0 1 1 1 2 2 2 2 0 2 0 2 1 1 2 0 1 0 2 1 0 0 2 2 1 2 0 2 2 0 0 2 0 0 0 2 1 2 1 1 0 2 2 2 1 1 1 1 0 1 0 1 2 2 1 0 2 0 1 2 0 0 1]. One off the 80 generated ternary Gold sequences is: Gold1=[1 2 2 0 2 1 2 0 0 2 0 2 2 2 0 1 1 2 2 2 2 1 0 0 2 2 0 2 1 0 1 0 1 1 0 0 0 1 0 2 1 0 0 2 0 1 0 2 2 0 2 0 0 0 2 1 1 0 0 0 0 1 2 2 0 0 2 0 1 2 1 2 1 1 2 2 2 1 2 0]. One can use a computer program to take the first 4 digits of the sequence, determine the decimal value plus 1 of this ternary word, move one digit to the right, determine the next 4 digit word's decimal value plus 1, until one reaches the end of the sequence. This can be done 77 times and can be translated into the following decimal sequence: [52 75 62 24 70 46 57 7 21 63 27 79 74 59 15 45 54 81 80 76 64 30 9 25 75 62 22 65 31 11 32 13 37 28 2 4 12 35 22 64 30 7 20 58 12 36 25 75 61 19 55 3 8 23 67 37 28 1 2 6 18 52 73 57 7 20 60 17 51 71 50 69 45 54 80 78 70]. One can see that some words (for instance 2, 7 and 75) are used more than once.

One way to achieve a series of unique words in this Gold sequence is by creating words of more than 4 symbols. It can be seen that re-occurring patterns have a maximum length of 7 symbols so that words of length 8 should be unique and enables the creation of a set of Gold sequences of which each can be detected by using an addressable memory method. The above decimal sequence can be expressed in a decimal sequence of 73 numbers formed by 8 symbol words: Gold1_8=[4201 6040 4998 1870 5610 3708 4563 565 1694 5081 2121 6363 5967 4779 1214 3640 4357 6510 6408 6100 5178 2411 670 2009 6025 4952 1733 5197 2467 838 2513 976 2928 2222 103 307 921 2761 1721 5161 2361 522 1564 4692 952 2854 1999 5997 4868 1481 4441 199 595 1783 5348 2922 2205 52 154 462 1384 4151 5892 4553 537 1610 4829 1365 4095 5724 4049 5586 3634]. This sequence consists of 73 unique 8 symbol ternary words.

One can take another sequence from this set of ternary Gold sequences Gold2=[0 1 1 0 1 1 1 1 1 0 0 2 1 1 1 1 1 0 1 1 2 2 2 2 2 1 0 0 1 0 2 1 0 2 0 2 0 2 1 1 2 1 1 1 1 1 1 2 2 0 1 1 1 1 1 1 2 1 1 1 0 0 0 0 0 0 1 2 2 1 2 0 1 2 0 2 0 2]. The translation of this sequence into 8 symbol decimal words provides: Gold2_8=[1013 3038 2552 1093 3277 3270 3248 3182 2984 2390 608 1823 5467 3278 3272 3255 3204 3051 2592 1215 3645 4373 6556 6544 6509 6403 6087 5138 2290 309 925 2775 1762 5286 2735 1643 4929 1664 4991 1850 5549 3524 4010 5469 3285 3292 3314 3380 3578 4172 5954 4739 1095 3284 3290 3307 3358 3511 3970 5347 2917 2189 6 18 53 159 475 1424 4272 6253 5637 3787 4800]. The sequence Gold1_8 is significantly different from Gold2_8. All Gold sequences of the set will generate significantly different 8 symbol word sequences.

All Gold sequences of the set generated by two different 4-element ternary LFSRs will generate different 8 symbol word sequences. Not only do words not repeat within a sequence, they will also not repeat within the set of sequences. Consequently decimal numbers based on these words are unique to a sequence of a set. This rule has also been tested on for instance binary Gold sequences, wherein a set of binary Gold-sequences was generated by two 6-elements LFSRs. One can then describe each sequence of that set by 12 bits overlapping words. Each word (and its decimal equivalent) is unique to a sequence and will only appear once in a set of sequences.

Accordingly a set of Gold sequences can be modified in such a may that, assuming that a Gold sequence was formed from 2 pseudo-random sequences based on words of k n-valued symbols, then each Gold sequence from the set can be expressed as a unique set of decimal number derived from overlapping words of 2k n-valued symbols. It is not required to use all sequences of a set. One can renumber or normalize the to be used sequences of decimal numbers by substituting the lowest number with 1, the next lowest number with 2 etc. Thus each Gold sequence then represents a certain number of frames, each frame having a decimal number that is unique to a set of Gold sequences.

It should be clear that each Gold sequence of p symbols made from sequences that can be decomposed in p words of k symbols, can be decomposed into p words of 2*k symbols.

Each hopping rule, derived from a Gold sequence in a set is orthogonal to another rule from the set. When a Gold sequence has p symbols, there exist a maximum of p different Gold sequences in the set. The auto-correlation of a Gold sequence has a peak value corresponding with the number of symbols. A Gold sequence is different from another Gold sequence when the maximum correlation between the two sequences has no peak like the one that occurs in the auto-correlation. A Gold sequence is different from a shifted version of itself and orthogonal is most cases, and can be used as such. However shifted Gold sequences require synchronization, because if shifted over the full p symbols the two shifted sequences will be coinciding.

Accordingly a Gold sequence from a set represented in its decimal hopping rule form is always orthogonal to any other sequence in the set of Gold sequences represented as a decimal hopping rule.

In general the term pseudo-random sequence is used for a class of sequences generated by LFSRs. LFSRs have a forbidden state and accordingly pseudo-random sequences generated by LFSRs do not comprise a forbidden state. The inventor has demonstrated a 'word' method wherein one can generate sequences comprising all possible words. Accordingly pseudo random sequences in aspects of the present invention comprise sequences with and without forbidden words, or of length $n^k-1$ n-valued symbols when generated by LFSR with k elements or of length $n^k$ n-valued symbols when generated by k n-valued word methods.

The general purpose of the present invention is to provide novel methods and systems which can be applied in the encipherment of sequences of symbols by transposition, using digital sequences with pseudo-noise or pseudo-noise like properties and the decipherment of the encrypted sequences. Sequences are made of series of symbols with an assigned position relative to an assumed or assigned origin or anchor point. The individual symbols and their order in a sequence may represent an electrical or optical signal. The position of a symbol may represent a physical order, a time slot, a frequency, a color or any other phenomenon or concept that can be represented as a position.

Figure 21:
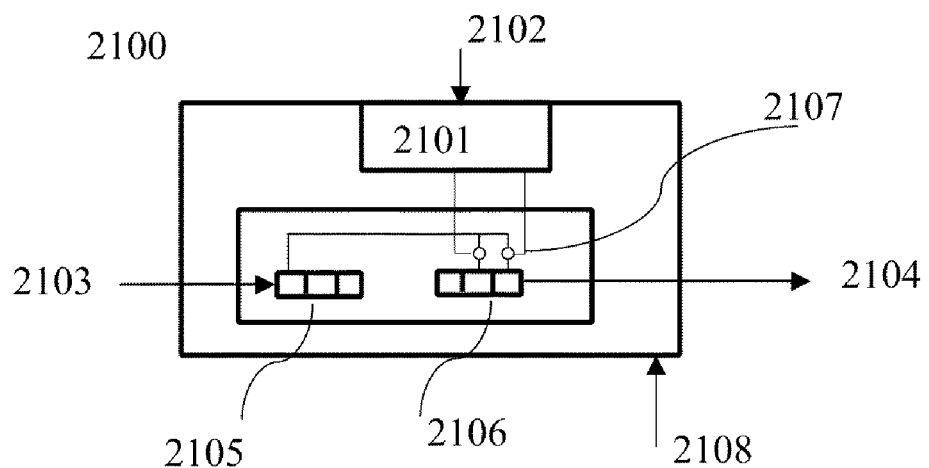
FIG. 21 is a diagram of a transposition system in accordance with an aspect of the present invention.
Figure 22:
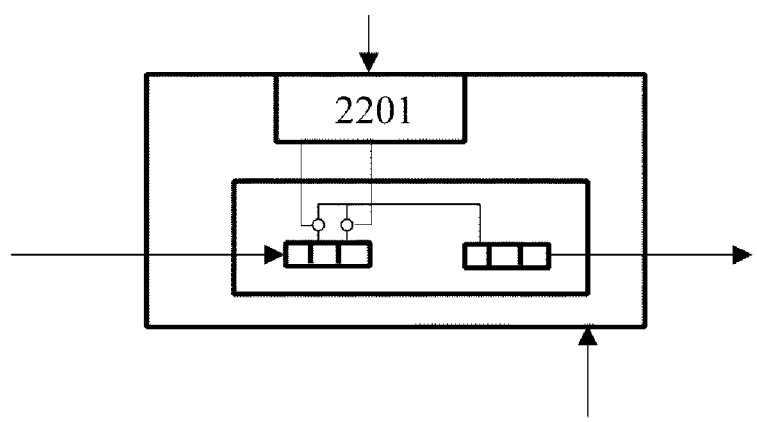
FIG. 22 is a diagram of a transposition reversing system in accordance with an aspect of the present invention.

It is one aspect of the present invention to provide a system that can execute the transposition rules. One such system is provided as a diagram 2100 in FIG. 21. The system has a module 2101 that either receives a sequence through input 2102 or generates a sequence internally and creates a transposition rule. A sequence of symbols is inputted on 2103 and is deserialized and stored in a module 2105. Transposition takes place by transferring the symbols from 2105 to a memory and serializing unit 2106. The order in which the symbols are stored in 2106 is determined by the rule as executed by 2101. In this example in a first embodiment the execution of the transposition is controlled by gates that control the transfer of symbols from 2105 to 2106. The gates (of which one, 2107, is identified in the diagram) are controlled by the transposition rule in 2101. After the symbols are transferred from 2105 to 2106 the transposed sequence is outputted on 2104. The circuit is controlled by a clock signal 2108. The system 2100 also has an internal clock circuit applying the external clock to count the number of symbols to be transposed and to initiate the outputting of the transposed sequence. Transposing inherently works on fixed length sequences, and processing delay will occur. One may diminish delays by for instance having one sequence buffered while another sequence is being processed. FIG. 22 shows a diagram of a system reversing the transposition. The system for reversal is essentially a mirror image of FIG. 21. A significant difference is that module 2201 creates the reversing rule of the module 2101.

Figure 23:
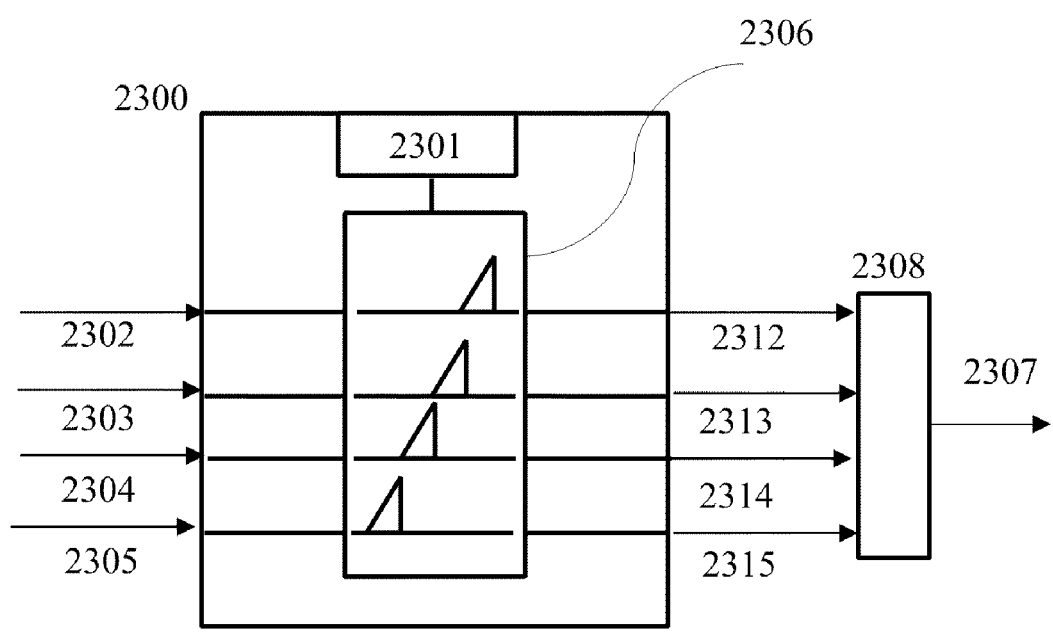
FIG. 23 is a diagram of a frequency hopping system in accordance with an aspect of the present invention.

FIG. 23 shows a diagram of a system that is an aspect of the present invention that creates and executes a plurality of transposition or hopping rules in a module 2301 in accordance with another aspect of the present invention, which is here illustrated for a frequency hopping system. The system 2300 is provided (for illustrative purposes) with 4 input signals, 2302, 2303, 2304 and 2305, for example all in base-band frequencies. The purpose of the system is to create one signal in the time-domain that has the 4 input signals in 4 different frequency bands. The system has a set of variable modulators 2306, of which the settings are controlled by a hopping rule 2301. During a finite time the settings of the modulators remain unchanged after which they are changed in an orthogonal fashion and in accordance with the methods of the present invention into a new setting. Because the selected modulation frequencies are orthogonal (and assuming that sufficient channel separation is achieved) the four outputted signals 2312, 2313, 2314 and 2315 will not interfere with each other and can be combined by a module 2308 into a single fdm signal 2307.

The transposition and hopping rules can be created and executed using a processor with memory. Such a processor may be part of a computer; however it may also be dedicated logic in customized processing circuits. Multi-valued signals and symbols may be processed by binary logic wherein each symbol is represented as a binary word. Words of n-valued symbols may be represented as a plurality of binary words. One may also apply logic circuitry that is able to implement multi-valued logic switching functions. It is to be understood that the invention is not limited in its application to the details of construction and to the arrangements of the components set forth in the description or illustrated in the drawings. The invention is capable of other embodiments and of being practiced and carried out in various ways. Also, it is to be understood that the phraseology and terminology employed herein are for the purpose of the description and should not be regarded as limiting.

The following patent applications, including the specifications, claims and drawings, are hereby incorporated by reference herein, as if they were fully set forth herein: (1) U.S. Non-Provisional patent application Ser. No. 10/935,960, filed on Sep. 8, 2004, entitled TERNARY AND MULTI-VALUE DIGITAL SCRAMBLERS, DESCRAMBLERS AND SEQUENCE GENERATORS; (2) U.S. Non-Provisional patent application Ser. No. 10/936,181, filed Sep. 8, 2004, entitled TERNARY AND HIGHER MULTI-VALUE SCRAMBLERS/DESCRAMBLERS; (3) U.S. Non-Provisional patent application Ser. No. 10/912,954, filed Aug. 6, 2004, entitled TERNARY AND HIGHER MULTI-VALUE SCRAMBLERS/DESCRAMBLERS; (4) U.S. Non-Provisional patent application Ser. No. 11/042,645, filed Jan. 25, 2005, entitled MULTI-VALUED SCRAMBLING AND DESCRAMBLING OF DIGITAL DATA ON OPTICAL DISKS AND OTHER STORAGE MEDIA; (5) U.S. Non-Provisional patent application Ser. No. 11/000,218, filed Nov. 30, 2004, entitled SINGLE AND COMPOSITE BINARY AND MULTI-VALUED LOGIC FUNCTIONS FROM GATES AND INVERTERS; (6) U.S. Non-Provisional patent application Ser. No. 11/065,836 filed Feb. 25, 2005, entitled GENERATION AND DETECTION OF NON-BINARY DIGITAL SEQUENCES; (7) U.S. Non-Provisional patent application Ser. No. 11/139,835 filed May 27, 2005, entitled MULTI-VALUED DIGITAL INFORMATION RETAINING ELEMENTS AND MEMORY DEVICES; (8) U.S. Provisional Patent Application No. 60/695,317 filed on Jun. 30, 2005 entitled THE CREATION AND DETECTION OF BINARY AND NON BINARY PSEUDO-NOISE SEQUENCES NOT USING LFSR CIRCUITS; and (9) U.S. patent application Ser. No. 11/427,498 filed on Jun. 29, 2006 entitled THE CREATION AND DETECTION OF BINARY AND NON-BINARY PSEUDO-NOISE SEQUENCES NOT USING LFSR CIRCUITS.

The invention claimed is:

1. A method for transposing a first sequence of symbols into a second sequence of symbols, comprising:
   inputting on a processor the first sequence of symbols, a symbol being represented by a signal;
   applying by the processor on the first sequence of symbols to generate the second sequence of symbols a reversible transposition rule defining a series of p transposed symbol positions, wherein each of the p transposed symbol positions is determined by one of p overlapping words of k n-state symbols with p>3, k>3 and n>1 in a sequence of n-state symbols; and
   the processor outputting the second sequence of symbols.

2. The method of claim 1, wherein the sequence of n-state symbols is at least part of a maximum length sequence.

3. The method of claim 1, wherein the reversible transposition rule comprises the steps:
   decomposing the sequence of n-state symbols into p consecutive words of k n-valued symbols; and
   replacing each of the p overlapping words by a unique number to form a sequence of unique numbers.

4. The method of claim 3, further comprising:
   placing a symbol in an $i^{th}$ position in the second sequence that is identical to a symbol in the first sequence of which a position is determined by the unique number in the $i^{th}$ position in the sequence of unique numbers.

5. The method as claimed in claim 3, further comprising:
   placing a symbol that is identical to a symbol in a $i^{th}$ position in the first sequence in a position in the second sequence, the position in the second sequence being determined by a unique number in the $i^{th}$ position in the sequence of unique numbers.

6. The method of claim 1, wherein a transposition is associated with assigning a time slot for a symbol in the second sequence.

7. The method of claim 1, wherein a transposition is associated with assigning a frequency slot for a symbol in the second sequence.

8. The method of claim 1, wherein a transposition is associated with assigning a communication channel for a symbol in the second sequence.

9. The method of claim 1, further comprising recovering the first sequence of symbols from the second sequence of symbols by a deciphering apparatus containing a processor that implements an inversion of the transposition rule.

10. An apparatus to generate a sequence of symbols from a sequence of transposed symbols, a symbol being represented by a signal, comprising:
    a memory;
    a processor enabled to execute instruction to perform the steps:
      applying by the processor on the sequence of transposed symbols to generate the sequence of symbols an inversion of a transposition rule, the transposition rule defining a series of p transposed symbol positions, wherein each of the p transposed symbol positions is determined by one of p overlapping words of k n-state symbols with p>3, k>3 and n>1 in a sequence of n-state symbols; and
    the processor outputting the sequence of symbols, wherein a symbol is represented by a signal.

11. The apparatus of claim 10, wherein the transposition rule comprises the steps:
    decomposing the sequence of n-state symbols into p consecutive words of k n-valued symbols; and
    replacing each of the p overlapping words by a unique number to form a sequence of unique numbers.

12. The apparatus of claim 11, the transposition rule further comprising:
    placing a symbol in an $i^{th}$ position in the second sequence that is identical to a symbol in the first sequence of which a position is determined by the unique number in the $i^{th}$ position in the sequence of unique numbers.

13. The apparatus as claimed in claim 11, the transposition rule further comprising:
    placing a symbol that is identical to a symbol in a $i^{th}$ position in the first sequence in a position in the second sequence, the position in the second sequence being determined by a unique number in the $i^{th}$ position in the sequence of unique numbers.

14. The apparatus of claim 10, wherein a transposition is associated with assigning a communication channel for a symbol in the sequence of transposed symbols.

15. An apparatus implementing a transposition rule to assign each of k symbols to p different transmission positions with k>p, a symbol being represented by a signal, comprising:
    a memory;
    a processor enabled to execute instruction to perform the steps:
      the processor making the transposition rule the current transposition rule;
      assigning each of a first p symbols of the k symbols to each of the p different transmission positions by the processor applying the current transposition rule, the transposition rule defining a series of p transposed symbol positions, wherein each of the p transposed symbol positions is determined by one of p overlapping words of k n-state symbols with p>3, k>3 and n>1 in a sequence of n-state symbols; and
      transmitting the first p symbols of the k symbols in the p transmission positions, wherein a transmission position in the p transmission positions represents one of p time sequential position in a single transmission channel or one of p transmission channels.

16. The apparatus of claim 15, further comprising:
    applying by the processor of the transposition rule to the current transposition rule to create a second transposition rule;
    the processor making the second transposition rule the current transposition rule;

assigning each of a second p symbols of the k symbols to each of the p different transmission positions by the processor applying the current transposition rule; and the processor performing the previous steps until all k symbols have been assigned one of p transmission positions.

17. The apparatus of claim 15, wherein one of p transmission channels is a Frequency Division Multiplex (FDM) transmission channel.

18. The apparatus of claim 15, wherein the transposition rule establishes a channel hopping rule.

19. The apparatus of claim 15, wherein the transposition rule establishes a frequency hopping rule.

20. The apparatus of claim 15, further comprising a corresponding apparatus that reverses the transposition rule.

* * * * *